United States Patent
Fujii et al.

[11] Patent Number: 5,125,432
[45] Date of Patent: Jun. 30, 1992

[54] ELECTROMAGNETIC VALVE DEVICE HAVING TWO ELECTROMAGNETIC VALVES

[75] Inventors: Etsuo Fujii; Yoichi Sugimoto, both of Wako; Akira Fujimoto, Miyazaki; Takeshi Taniguchi, Miyazaki; Yoshiteru Nakatake, Miyazaki; Shohachi Setoguchi, Miyazaki, all of Japan

[73] Assignees: Honda Giken Kogyo Kabushiki Kaisha, Tokyo; Honda Lock Manufacturing Co., Ltd., Miyazaki, both of Japan

[21] Appl. No.: 735,358

[22] Filed: Jul. 24, 1991

[30] Foreign Application Priority Data

| Aug. 8, 1990 | [JP] | Japan | 2-210856 |
| Aug. 8, 1990 | [JP] | Japan | 2-210857 |
| Aug. 8, 1990 | [JP] | Japan | 2-210858 |
| Aug. 8, 1990 | [JP] | Japan | 2-210859 |

[51] Int. Cl.⁵ .................................. F15B 13/044
[52] U.S. Cl. .............................. 137/596.17; 137/884; 303/119 SV
[58] Field of Search .......................... 137/596.17, 884; 303/119 SV

[56] References Cited

U.S. PATENT DOCUMENTS

| 3,842,860 | 10/1974 | Stampfli | 137/596.17 |
| 4,337,794 | 7/1982 | Yamanaka et al. | 137/596.17 |
| 4,355,661 | 10/1982 | Mayer | 137/596.17 X |
| 4,561,701 | 12/1985 | Fujii et al. | 303/119 |
| 4,674,536 | 6/1987 | Warrick | 137/596.17 |
| 4,679,589 | 7/1987 | Inden et al. | 137/596.17 |
| 4,785,848 | 11/1988 | Leiber | 137/596.17 |
| 4,821,770 | 4/1989 | Parrott et al. | 137/596.17 |
| 4,859,005 | 8/1989 | Rey et al. | 137/596.17 X |
| 4,922,961 | 5/1990 | Maehara | 137/596.17 |

FOREIGN PATENT DOCUMENTS

| 63-96378 | 4/1988 | Japan . |
| 1428741 | 3/1976 | United Kingdom . |

Primary Examiner—Gerald A. Michalsky
Attorney, Agent, or Firm—Frishauf, Holtz, Goodman & Woodward

[57] ABSTRACT

An electromagnetic valve device having two electromagnetic valves comprises a solenoid unit having a unit construction in the form of a hollow cylinder and having a pair of solenoids, and a valve unit having a pair of valve mechanisms and having a unit construction in the form of a substantially solid cylinder. The solenoid unit has a pair of coil bobbins, and a pair of caps accommodating said coil bobbins. The valve unit is fitted through a central through hole of the solenoid unit and thus mounted therein. The coil bobbins are fixed to a yoke interposed therebetween and thus joined together.

8 Claims, 18 Drawing Sheets

ELECTROMAGNETIC VALVE DEVICE HAVING TWO ELECTROMAGNETIC VALVES

BACKGROUND OF THE INVENTION

This invention relates to an electromagnetic valve device having two electromagnetic valves, which is adapted for use e.g. in antiskid control brake systems for automotive vehicles.

An electromagnetic valve device of this kind has been proposed e.g. by British Patent Publication No. 1428741, which comprises a first electromagnetic valve comprising a first hollow cylindrical member (tubular section), a first winding wound on the first hollow cylindrical member, a first core which is slidable within the first hollow cylindrical member by energization or deenergization of the first winding, and a first return spring urging the first core, a second electromagnetic valve comprising a second hollow cylindrical member (tubular section), a second winding wound on the second hollow cylindrical member, a second core which is slidable within the second hollow cylindrical member by energization or deenergization of the second winding, and a second return spring urging the second core, and a cap made of a ferromagnetic material and forming part of magnetic paths associated with the first and second cores, the first and second electromagnetic valves being arranged in superposed coaxial relationship and housed within the cap with a ferromagnetic disc-shaped member interposed therebetween.

This conventional electromagnetic valve device is presumably assembled in the following manner: the component parts of the first and second electromagnetic valves are incorporated one by one into the cap through an open end thereof, and then a closing member is screwed into the open end of the cap to complete the assembly work. Therefore, in this electromagnetic valve device, lots of component parts of the two electromagnetic valves have to be incorporated into a single cap, which makes the assembly work complicated and time-consuming, thus being unsuitable for mass production of the electromagnetic valve device.

Further, the conventional electromagnetic valve device is a three-way valve for fluid in which energization and deenergization of each winding of the two valves is controlled to thereby cause each core to slide by the magnetically attracting force of the winding associated therewith to open and close each valve to thereby selectively establish communication between three fluid passages. In this valve device, the duration and timing of opening/closing of each electromagnetic valve is electrically controlled by a pulse signal applied to each winding. However, with such electrical control of the opening/closing of two electromagnetic valves, there is a possibility that the valves are not positively opened or closed at desired timing due to variations in frictional forces acting on the core of each valve etc. For example, one valve does not open following closing of the other valve, but the one valve can open even while the other valve is still open. This results in a undesired state of communication between the three fluid passages.

In the meanwhile, an assembly unit having a plurality of electromagnetic valve devices, which is used in antiskid control brake systems, has been proposed by Japanese Provisional Patent Publication No. 63-96378 (corresponding to German Patent Application No. P 36 34 349.8). The assembly unit comprises a plurality of electromagnetic valve devices, a base member having pairs of first and second fluid passages corresponding in number to the number of the electromagnetic valve devices and disposed such that communication between each pair of first and second fluid passages is controllably established or cut off by each electromagnetic valve device associated therewith, a magnetic hollow cylinder-forming element having a plurality of magnetic hollow cylinders integrally formed therewith and accommodating each electromagnetic valve, and a covering plate, wherein the electromagnetic valves and magnetic hollow cylinder-forming element are clamped between the base member and the covering plate to form a changeover valve assembly unit.

However, according to this prior art, when assembling the changeover valve assembly unit, it is required that the electromagnetic valve devices be placed onto the base member at respective separate predetermined locations, and then the magnetic hollow cylinder-forming element be placed onto the base member such that each magnetic hollow cylinder accommodates each magnetic valve device associated therewith. This imposes problems of many assembly steps and complicated assembly works. Further, in this prior art, the magnetic hollow cylinders of the magnetic hollow cylinder-forming element are formed of a magnetic material, since they each serve as a frame for forming magnetic paths for each electromagnetic valve device, as well as a frame for holding each associated electromagnetic valve. Therefore, each magnetic hollow cylinder adversely affects magnetic attracting forces generated by electromagnetic valve devices which are accommodated in respective adjacent magnetic hollow cylinders.

SUMMARY OF THE INVENTION

It is a first object of the invention to provide an electromagnetic valve device having two electromagnetic valves, which facilitates the assemblage and hence has improved mass-productivity.

It is a second object of the invention to provide an electromagnetic valve device having two electromagnetic valves, which comprises a solenoid unit which can be easily assembled by a simple means and hence has improved mass-productivity.

It is a third object of the invention to provide an electromagnetic valve having two electromagnetic valves, which is capable of controlling the opening/closing timing of the two valves as desired to thereby prevent occurrence of an undesired state of communication between three fluid passages.

It is a fourth object of the invention to provide an assembly having a plurality of electromagnetic valve devices, which has a reduced number of assembly steps to facilitate the assemblage, and is free from adverse affects caused by each magnetic hollow cylinder on the magnetic attracting forces generated by the electromagnetic valve devices accommodated in the adjacent magnetic hollow cylinders.

To attain the first object, according to a first aspect of the invention, there is provided an electromagnetic valve device having two electromagnetic valves, comprising:

a solenoid unit having a unit construction in the form of a hollow cylinder having a through hole axially extending therethrough, the solenoid unit including a pair of solenoids having a pair of coil bobbins arranged in superposed coaxial relationship and each having a central through hole formed therein and an exciting coil wound thereon, and a pair of caps for forming magnetic paths, each of the caps having an end wall having formed therein an opening concentric with the central through hole of each of the coil bobbins, the opening forming the through hole together with the central through hole of each of the coil bobbins, the caps accommodating respective associated ones of the coil bobbins, the caps being joined together in a manner such that the caps have open ends thereof opposed to each other; and a valve unit having a pair of valve means having a pair of valve bodies which are opened and closed by respective ones of the solenoids, the valve unit having a unit construction in the form of a substantially solid cylinder, the valve unit being mounted in the solenoid unit in a manner such that the valve unit has a cylindrical body thereof fitted through the through hole of the solenoid unit.

According to the first aspect of the invention having the above features, the valve unit is fixed to the solenoid unit in the state in which the cylindrical part of the valve unit having a unit construction is inserted through the through hole of the solenoid unit having a unit construction. Therefore, the valve device can be easily assembled, which makes it suitable for mass production.

To attain the second object, according to a preferred embodiment of the present invention, the solenoid unit includes a yoke interposed between the coil bobbins, the coil bobbins being joined together in a manner such that the coil bobbins have ends thereof opposed to each other and fixedly fitted in the yoke.

According to the present invention having these features, a pair of coil bobbins can be joined together by fitting in a yoke. Therefore, the solenoid unit can be embodied by a simple unit construction, and hence can be easily assembled, which makes it suitable for mass production.

To attain the third object of the invention, according to a second aspect or a third aspect of the invention, there is provided, in an electromagnetic valve device having two electromagnetic valves, including a pair of solenoids, a pair of valve means including a pair of valve bodies which are opened and closed by respective ones of the solenoids, and a pair of return springs urging respective ones of the valve bodies, the electromagnetic valve device functioning as a three-way valve for selectively establishing communication between three passages for fluid by opening and closing of the valve means, the improvement wherein the solenoids have magnetically attracting forces thereof set different from each other to make timing of opening and closing of one of the valve means different from that of the other of the valve means, or alternatively, the improvement wherein the return springs have urging forces thereof set different from each other to make timing of opening and closing of one of the valve means different from that of the other of the valve means.

According to the second or third aspect of the invention having these features, either the magnetically attracting forces of the solenoids or the urging forces of the return springs are set different from each other, so that the timing of opening/closing of the one valve means is made different from that of opening/closing of the other valve means. Therefore, the timing of opening/closing of the valve means of the two electromagnetic valves can be reliably set as desired, which in turn enables to prevent occurrence of an undersired state of communication between the three passages for fluid.

To attain the fourth object of the invention, according to a fourth aspect of the invention, there is provided, in an assembly unit including a plurality of electromagnetic valve devices, and a base member on which the electromagnetic valve devices are placed, the base member having pairs of first and second fluid passages corresponding in number to the number of the electromagnetic valve devices and disposed such that communication between each pair of first and second fluid passages is controlled by an associated one of the electromagnetic valve devices, the improvement comprising:

a casing formed of resin and having formed therein a plurality of separate chambers respectively accommodating the electromagnetic valve devices; and a clamping plate disposed on an end face of the casing remote from the base member;

the casing being sandwiched between the base member and the clamping plate and fixed to the base member.

According to the fourth aspect of the invention having these features, when assembling the assembly unit having a plurality of electromagnetic valve devices, it is only required that the casing formed of resin with the electromagnetic valve devices previously mounted therein is placed onto the base member, without necessitating a complicated work of placing a plurality of valve devices on the base member at predetermined separate locations and then placing the casing onto the base member for receiving the valve devices as is the case with the above described prior art disclosed in Japanese Provisional Patent Publication (Kokai) No. 63-96378. Therefore, the assembly unit can be easily assembled by a reduced number of assembly steps. Further, since the electromagnetic valve devices are accommodated in the respective chambers separately formed in the casing formed of resin, they do not have adverse affects on magnetically attracting forces produced by adjacent valve devices as is the case with the prior art.

The above and other objects, features, and advantages of the invention will become more apparent from the ensuing detailed description taken in conjunction with the accompanying drawings.

DETAILED DESCRIPTION

The invention will now be described in detail with reference to the drawings showing embodiments thereof.

Figure 1:
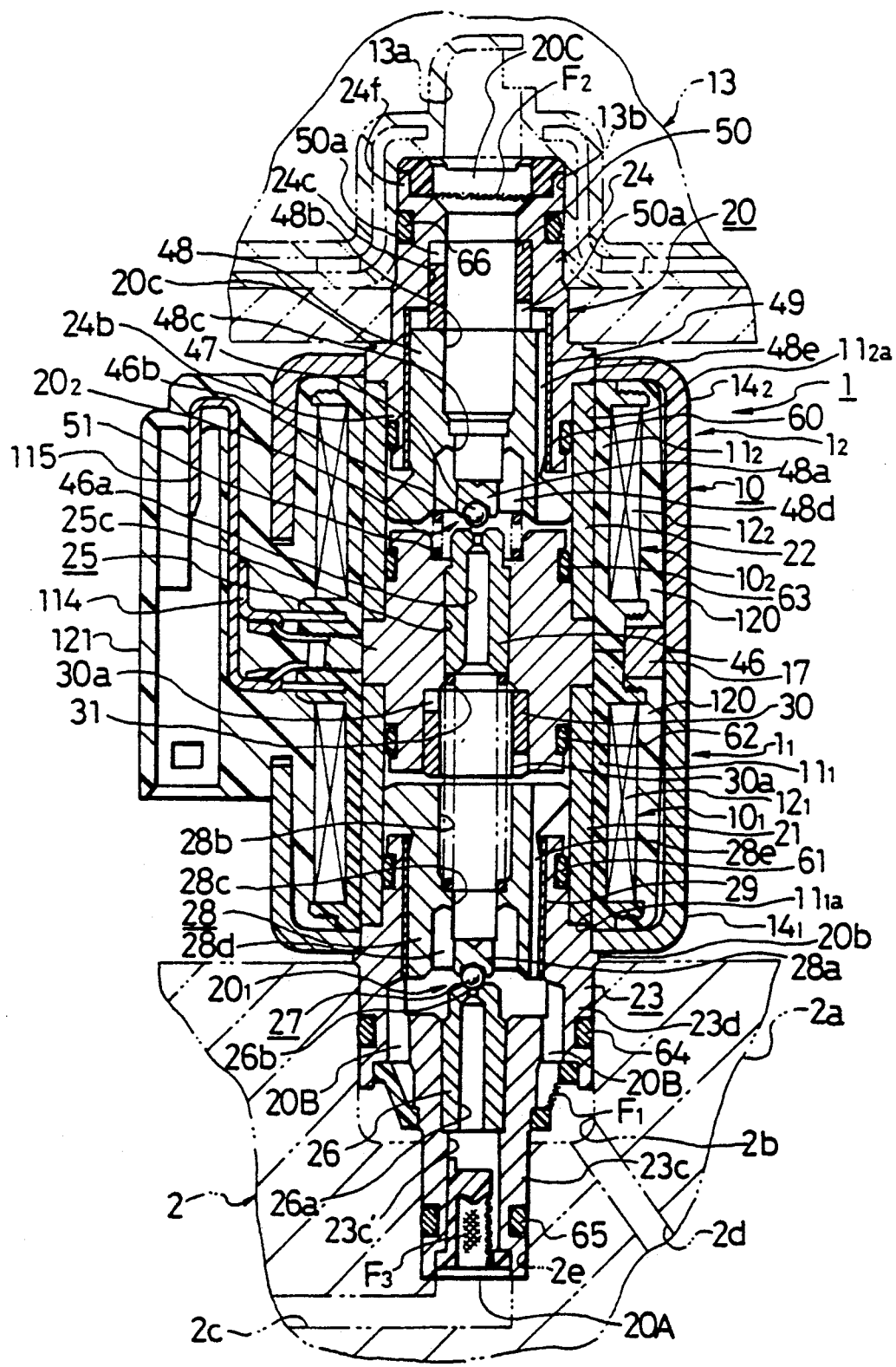
FIG. 1 is a longitudinal cross-sectional view of an electromagnetic valve device having two electromagnetic valves according to an embodiment of the invention.

FIG. 1 shows an electromagnetic valve device 1 having two electromagnetic valves, according to an embodiment of the invention. As shown in FIG. 1, the electromagnetic valve device 1 is mounted in a mounting hole 2b formed in a body 2a of a modulator 2 forming part of an antilock brake system, not shown, installed on an automotive vehicle. The antilock brake system is a known hydraulic type in which when the automotive vehicle is suddenly braked, the pressure of oil within wheel cylinders of the system is controlled such that the slip rate of which wheels is maintained within a predetermined range. The modulator body 2a has formed therein a passage 2c for fluid on the pressure source side leading to an accumulator, not shown, and a passage 2c for fluid on the load side leading to an antilock control chamber, not shown, of the modulator 2.

The electromagnetic valve device 1 comprises a normally-closed electromagnetic valve $1_1$, and a normally-open electromagnetic valve $1_2$, as shown in FIG. 1.

Figure 2:
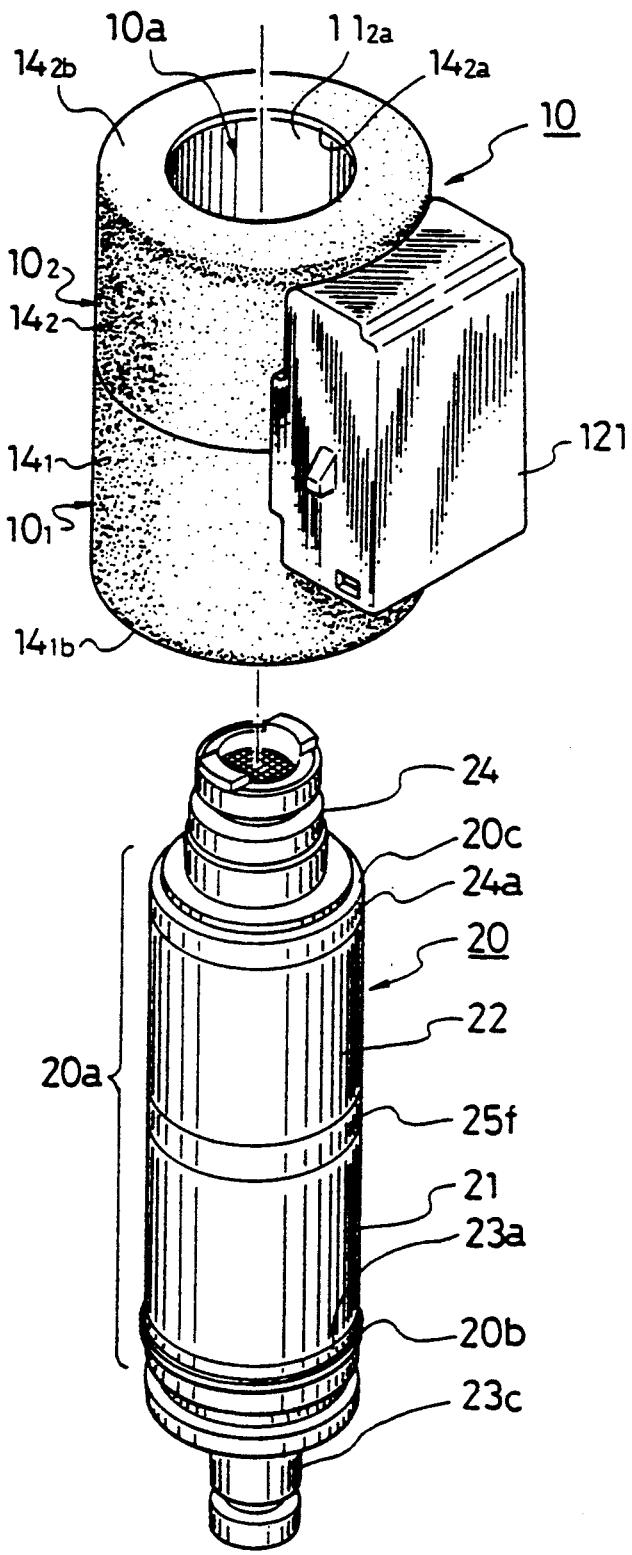
FIG. 2 is an exploded perspective view of the electromagnetic valve device shown in FIG. 1.

As shown in FIGS. 1 and 2, the valve device 1 has a solenoid unit 10 formed of a pair of solenoids $10_1$, $10_2$ and having a unit construction in the form of a hollow cylinder having an axial through hole 10a (FIG. 2) formed therethrough, and a valve unit 20 formed of a pair of valve mechanisms (valve means) $20_1$, $20_2$ which are opened and closed by respective associated ones of the solenoids $10_1$, $10_2$ and having a unit construction in the form of a substantially solid cylinder. The valve unit 20 is fitted through the through hole 10a. The valve mechanism $20_1$ forms the normally-closed electromagnetic valve $1_1$ together with the solenoid $10_1$, while the valve mechanism $20_2$ forms the normally-open electromagnetic valve $1_2$ together with the solenoid $10_2$.

Figure 3:
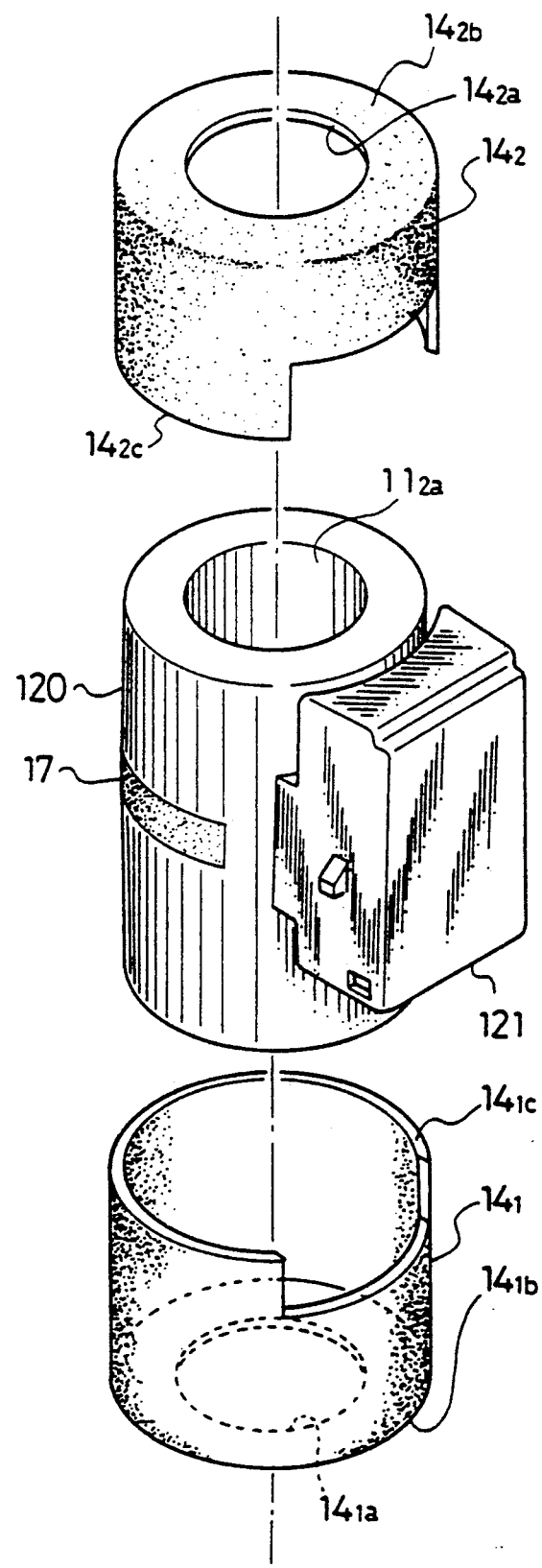
FIG. 3 is an exploded perspective view of a solenoid unit appearing in FIG. 2.

As shown in FIGS. 1 to 3, the solenoid unit 10 has a pair of coil bobbins $11_1$, $11_2$ which are arranged in superposed coaxial relationship and have respective exciting coils $12_1$, $12_2$ wound thereon, and a pair of caps $14_1$, $14_2$ also serving to form magnetic paths, which have end walls $14_{1b}$, $14_{2b}$ formed with respective openings $14_{1a}$, $14_{2a}$ which are concentric with and coincide in diameter with central through holes $11_{1a}$, $11_{2a}$ of the coil bobbins $11_1$, $11_2$ and form together therewith the through hole 10a. The solenoid unit 10 is constructed such that the caps $14_1$, $14_2$ respectively accommodating the coil bobbins $11_1$, $11_2$ are joined together with other open ends $14_{1c}$, $14_{2c}$ thereof being opposed to each other, preferably abutting against each other as illustrated in FIG. 1.

As shown in FIGS. 1 and 2, the valve unit 20 has a cylindrical body 20a fitted through the through hole 10a and an annular engaging projection 20b formed around one end of the cylindrical body 20a. When assembling the valve device 1, the cylindrical body 20a is inserted into the through hole 10a until the annular engaging projection 20b abut against an inner end face of the end $14_{1b}$ of the cap $14_1$, and in this state, the other end 20c of the cylindrical body 20a is caulked to thereby fix the valve unit 20 to the solenoid unit 10 as shown in FIG. 1.

As shown in FIG. 1, the valve unit 20 has a fluid inlet port 20A opening into the passage 2c on the pressure source side, a passage 20B for fluid communicating with the passage 2d on the load side via a filter $F_1$ and the mounting hole 2b, and a fluid outlet port 20c having a filter $F_2$ and connected to a reservoir tank 13. Further, axially arranged inside the valve unit 20 are the valve mechanism $20_1$ of the normally-closed electromagnetic valve $1_1$ which is opened or closed by energization or deenergization of the exciting coil $12_1$ to control communication between the passage 2c on the pressure source side and the passage 20B (and hence the passage 2d on the load side), and the valve mechanism $20_2$ of the normally-open electromagnetic valve $1_2$ which is closed or opened by energization or deenergization of the exciting coil $12_2$ to control communication between the passage 2d and the fluid outlet port 20C (and hence the reservoir tank 13).

Figure 4:
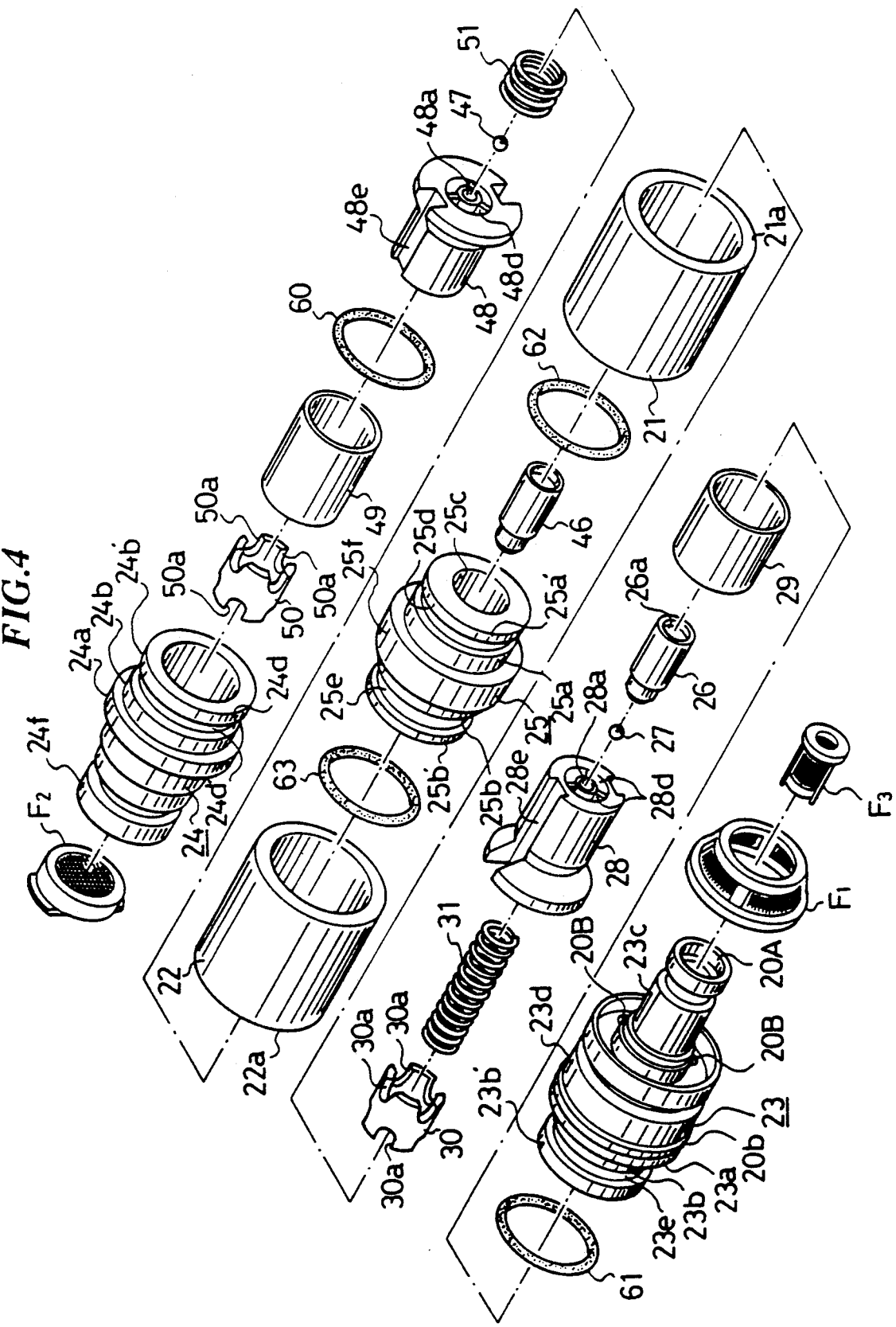
FIG. 4 is an exploded perspective view of a valve unit appearing in FIG. 2, which is exploded into all the component parts separate from each other.

As shown in FIGS. 1, 2 and 4, the valve unit 20 comprises a core 25 having a first hollow shaft portion 25a and a second hollow shaft portion 25b formed on both sides of an increased-diameter portion 25f thereof, first and second pipes 21, 22 having ends thereof respectively force-fitted on the first and second hollow shaft portions 25a, 25b, an inlet side hollow cylinder (first hollow cylinder) 23 having a hollow cylindrical portion 23b force-fitted into the the other end of the first pipe 21, and a flange 23a abutting against the end face of the other end of same, an outlet side hollow cylinder (second hollow cylinder) 24 having a hollow cylindrical portion 24b force-fitted into the other end of the second pipe 22, and a flange 24a abutting against the end face of the other end of same, a first armature 28 holding a first spherical valve body 27 and slidably arranged within the first hollow cylinder 23, and a second armature 48 holding a second spherical valve body 47 and slidably arranged within the second hollow cylinder 24. The valve unit 20 is assembled by force-fitting the hollow cylinders 23, 24 into ends of the respective pipes 21, 22 and force-fitting the other ends of the pipes 21, 22, onto the hollow shaft portions 25a, 25b of the core 25 respectively. The outer peripheral surface of the cylindrical body 20a of the valve unit 20 is formed by the outer peripheral surfaces of the flanges 23a, 24a, the outer peripheral surfaces of the pipes 21, 22, and the outer peripheral surface of the increased-diameter portion 25f of the core 25 (see FIG. 2).

As shown in FIGS. 1 and 4, the annular engaging projection 20b is formed on the outer peripheral surface of the first hollow cylinder 23. The first hollow cylinder 23 has an reduced-diameter portion 23c at a location lower than an axially intermediate portion thereof. The passages 20B are axially formed through a boundary shoulder portion between the reduced-diameter portion 23c and an increased-diameter portion 23d of the first hollow cylinder 23, in circumferentially spaced relationship. The fluid inlet port 20A extends through an lower end of the reduced-diameter portion 23c. The filter $F_3$ is mounted in a central through hole 23c' formed in the reduced-diameter portion 23c, at a location lower than an intermediate portion thereof. A first valve seat member 26 having an axial through hole 26a formed therethrough is mounted in the central through hole 23c' at an upper location than the intermediate portion thereof. The first valve seat member 26 has a central portion of an upper end surface thereof serving as a valve seat surface 26b, on which the first spherical valve body 27 is to be seated. The first spherical valve body 27 is retained in a central holder portion 28a of the first armature 28.

As shown in FIG. 1, the first armature 28 is slidably fitted in an armature pipe 29 fixedly fitted into the hollow cylindrical portion 23b of the first hollow cylinder 23. The first armature 28 has a spring-receiving recess 28b which is axially formed in an upper central portion thereof and also serves as a passage for fluid. The spring-receiving recess 28b communicates with passages 28d formed around the central holder portion 28a via a central hole 28c continuous with the spring-receiving recess 28b. Further, the first armature 28 has passages 28e longitudinally formed in the outer peripheral surface thereof (see FIG. 4).

As shown in FIG. 1, a first armature stopper 30 is mounted in a central through hole 25c formed in the core 25, at a location lower than an intermediate portion thereof. The first armature stopper 30 is in the form of an annulus and has a plurality of cutouts 30a formed in both ends thereof in circumferentially spaced relationship (see FIG. 4). The lower end face of the first armature stopper 30 is slightly projected downward from the lower end face of the core 25. When the exciting coil $12_1$ is energized to produce a magnetically attracting force to cause the first armature 28 to be lifted upward against the urging force of a return spring 31, the upper end face of the armature 28 abuts against the lower end face of the first armature stopper 30 whereby the upper limit position of the first armature 28 is determined. The return spring 31 which is formed of a coiled spring and biases the first armature 28 downward is interposed between the lower end shoulder of the spring-receiving recess 28b and the lower end face of a second valve seat member 46.

The second valve seat member 46 is mounted in the central through hole 25c of the core 25 at a location upper than an intermediate portion thereof. The second valve seat member 46 has substantially the same shape as the first valve seat member 26, i.e. it has an axial through hole 46a formed therethrough and a valve seat surface 46b in a central portion of an upper end surface thereof, on which the second spherical valve body 47 is to be seated. The second spherical valve body 47 is retained in a central holder portion 48a of the second armature 48. The second armature 48 is slidably fitted in an armature pipe 49 fixedly fitted into the hollow cylindrical portion 24b of the second hollow cylinder 24. The second armature 48 has a central recess 48b axially formed therein at a location upper than an intermediate portion thereof. The central recess 48b communicates with passages 48d formed around the central holder portion 48a via a central hole 48c continuous with the central recess 48b. Further, the second armature 48 has passages 48e longitudinally formed in the outer peripheral surface thereof.

The second hollow cylinder 24 has a central through hole 24c formed therein and communicating between the interior space of the hollow cylindrical portion 24b and the fluid outlet port 20C. A second armature stopper 50 is mounted in the central through hole 24c. The second armature stopper 50 has substantially the same shape as the first armature stopper 30. In other words, it is in the form of an annulus and has a plurality of cutouts 50a formed in both ends thereof in circumferentially spaced relationship. When the exciting coil $12_2$ is energized to produce a magnetic attracting force to cause the second armature 48 to be lifted upward against the urging force of a second return spring 51, the upper end face of the armature 48 abuts against the lower end face of the second armature stopper 50 whereby the upper limit position of the second armature 48 is determined. The second return spring 51 which is formed of a coiled spring and biases the second armature 48 upward is interposed between the lower end face of the second armature 48 and the upper end face of the core 25. The fluid outlet port 20C is formed in the upper end of the second hollow cylinder 24, and the filter $F_2$ is mounted in the fluid outlet port 20C.

As shown in FIGS. 1, and 4 to 6, the hollow cylindrical portion 24b of the second hollow cylinder 24 has an annular groove 24d formed in the outer peripheral surface thereof, in which an O-ring 60 is mounted. A portion 24b' of the hollow cylindrical portion 24b lower than the annular groove 24d has a slightly reduced diameter such that a clearance S is formed between the portion 24b' and the inner peripheral surface of the second pipe 22. Similarly, as shown in FIGS. 1 and 4, annular grooves 23e, 25d, and 25e are formed in the outer peripheral surfaces of the hollow cylindrical portion 23b of the first hollow cylinder 23, and the first and second hollow shaft portions 25a and 25b, in which O-rings 61, 62, and 63 are mounted, respectively. Portions 23b', 25a', and 25b' of the portions 23b, 25a, and 25b on the respective outer sides of the annular grooves 23e, 25d, and 25e have slightly reduced diameters such that clearances are formed between the portions 23b', 25a', and 25b', and the inner peripheral surfaces of the first and second pipes 21, and 22.

Figure 7:
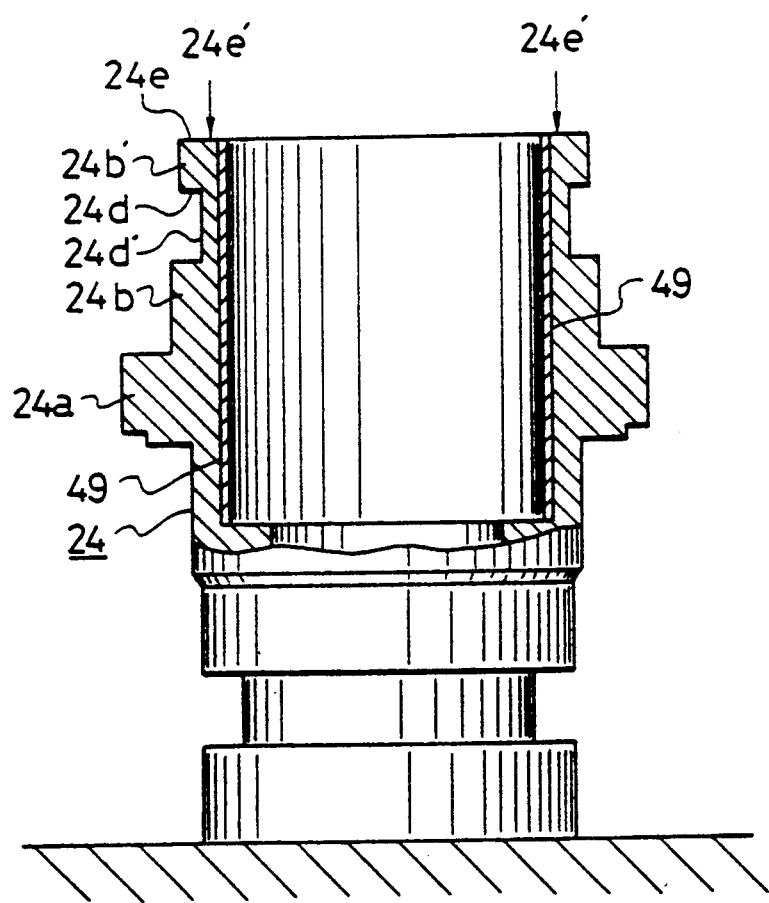
FIG. 7 is a fragmentary cross-sectional view of part of the valve unit appearing in FIG. 2, showing the state of an armature pipe being fixed in a hollow cylindrical member.

Further, as shown in FIG. 7, the armature pipe 49 is fixed to the second hollow cylinder 24 by caulking an end face 24e of the hollow cylindrical portion 24b, e.g. at three points 24e' which are located radially inward of a bottom face $24d'$ of the annular groove $24d$. The armature pipe 29 is fixed to the first hollow cylinder 23 in the same manner as the armature pipe 49.

Figure 8:
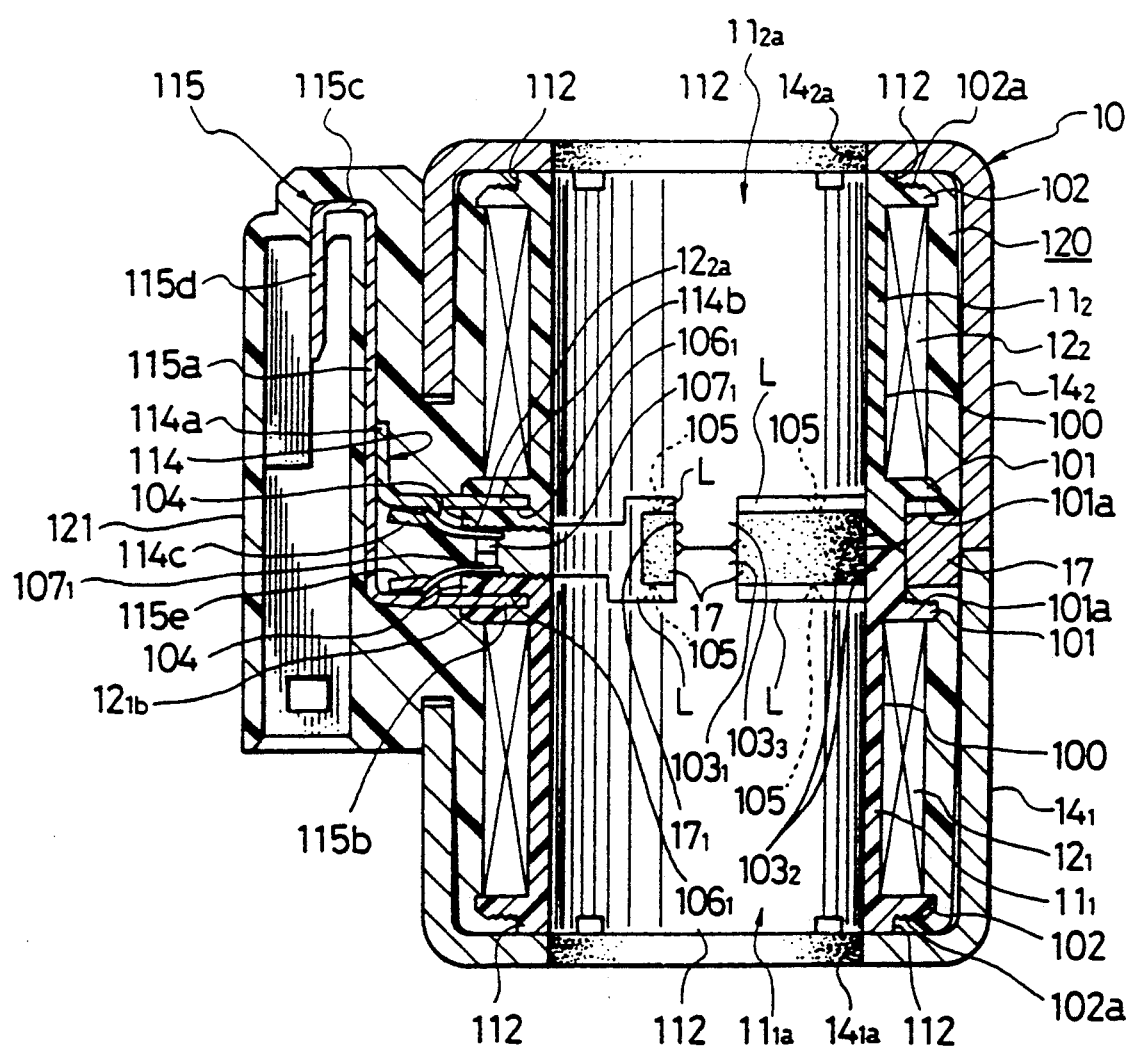
FIG. 8 is a longitudinal cross-sectional view of a solenoid unit appearing in FIG. 2.

As shown in FIGS. 1 and 8, the solenoid unit 10 has a yoke 17 in addition to the coil bobbins $11_1$, $11_2$ and the caps $14_1$, $14_2$ for forming magnetic paths. The opposed ends of the coil bobbins $11_1$, $11_2$ are fitted in the yoke 17 and fixed thereto whereby the coil bobbins $11_1$, $11_2$ are joined together, as described in detail later.

The construction of the solenoid unit 10 will be further described in detail.

Figure 9:
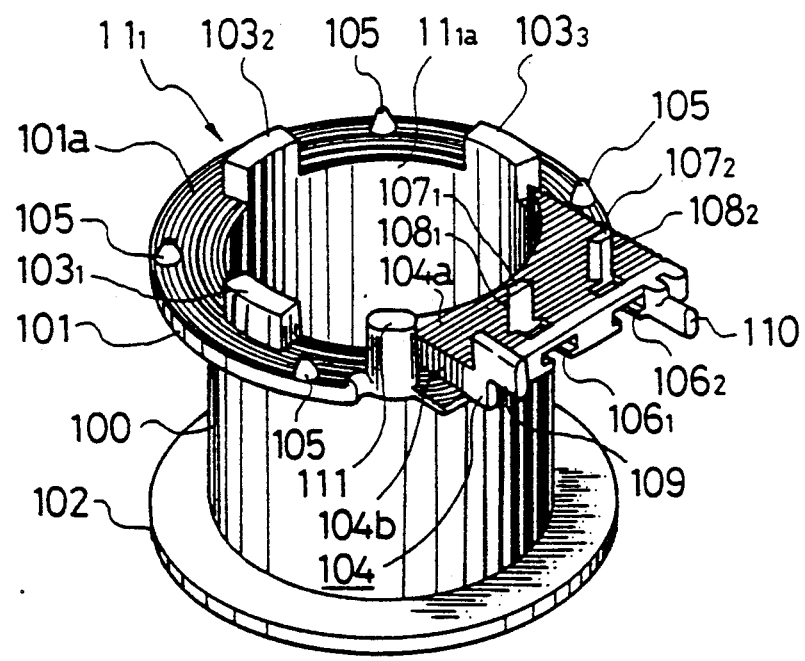
FIG. 9 is a perspective view of a coil bobbin of the solenoid unit shown in FIG. 8.
Figure 10:
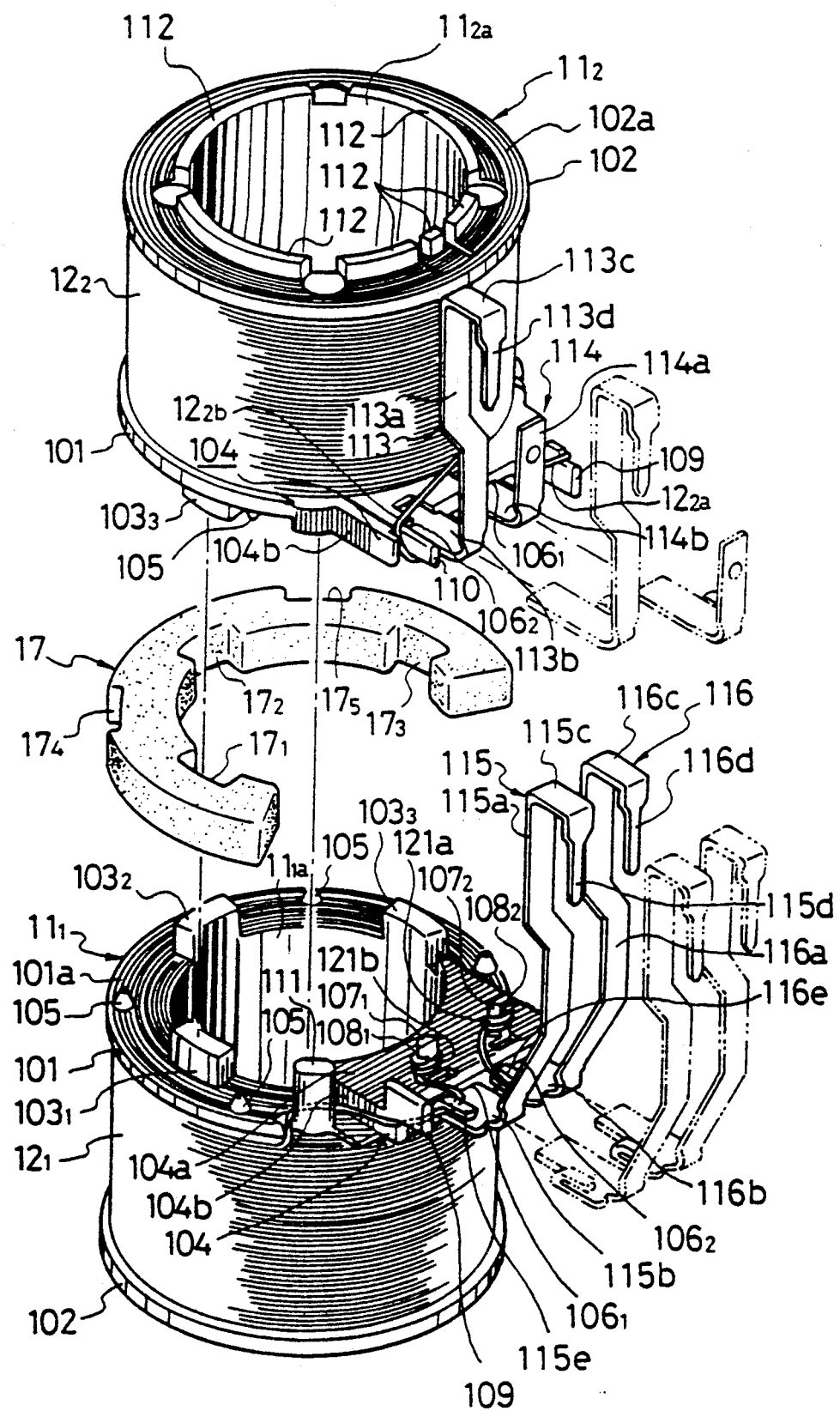
FIG. 10 is an exploded perspective view of a pair of coil bobbins and a yoke in their disconnected state of the solenoid unit appearing in FIG. 8.

The coil bobbins $11_1$, $11_2$ are formed of synthetic resin and are substantially identical in shape to each other. As shown in FIGS. 9 and 10, each of the coil bobbins $11_1$, $11_2$ comprises a main body 100 in the form of a short hollow cylinder having open opposite ends, and annular flanges 101, 102 formed integrally on the respective open opposite ends. The end face $101a$ of one flange 101 on one end side of the main body 100 has a plurality of (three, in the present embodiment) force fitting axial projections $103_1$, $103_2$, $103_3$ formed integrally thereon at a radially inner side thereof and circumferentially arranged at intervals of a predetermined angle (90°, in the present embodiment). The axial projections $103_1$ to $103_3$ each have a square cross-section. Further, a radially projected wall 104 is formed integrally on the end face $101a$ of the flange 101 at a location diametrically opposite to the central axial projection $103_2$. The radially projected wall 104 has an arcuate inner end wall flush with the inner peripheral wall of each central through hole $11_{1a}$ or $11_{2a}$ of the coil bobbins $11_1$, $11_2$, and an outer end projected outward from the outer peripheral surface of the flange 101. In addition, the inner peripheral walls of the axial projections $103_1$, $103_2$, $103_3$ are in the form of an arc and flush with the central through hole $11_{1a}$ or $11_{2a}$. An upper surface $104a$ of the radially projected wall 104 is axially projected from the end face $101a$ of the flange 101. Spacer projections 105 are formed on radially outer portions of the end face $101a$ of the flange 101 at locations between the projections $103_1$ and $103_2$, the projections $103_2$ and $103_3$, the projection $103_3$ and the radially projected wall 104, and the radially projected wall 104 and the projection $103_1$. Each spacer projection 104 is in the form of a cone and lower in height than the projections $103_1$ to $103_3$. The outer peripheral end face of the radially projected wall 104 has a pair of terminal-fitting recesses $106_1$, $106_2$ formed therein. Engaging projections $107_1$, $107_2$ are formed integrally on the upper surface $104a$ of the wall 104 at locations corresponding to the terminal-fitting recesses $106_1$, $106_2$. The engaging projections $107_1$, $107_2$ each have a trapezoidal cross-section. A winding-starting end portion of each exciting coil $12_1$ or $12_2$ is engaged on one of each engaging projection $107_1$ or $107_2$ of the coil bobbins $11_1$, $11_2$, while a winding-ending end portion of each exciting coil $12_1$ or $12_2$ on the other of each engaging projection $107_1$ or $107_2$. One engaging projection $107_1$ has a wider outer peripheral wall and a narrower inner peripheral wall, whereas the other engaging projection $107_2$ has a narrower outer peripheral wall and a wider inner peripheral wall. The angles formed at both corners $108_1$, $108_2$ of the longer side of the trapezoidal cross-section of each engaging projection $107_1$, $107_2$ are acute such that the exciting coils $12_1$, $12_2$ may be cut off thereby. Further, hooking projections 109, 110 are formed integrally on the respective side ends of the radially projected wall 104 for hooking the exciting coils $12_1$, $12_2$. Further, an axial hooking projection 111 is formed on the end face $101a$ of the flange 101 at a location near one side of the radially projected wall 104 for hooking the coil $12_1$ or $12_2$. The end faces $101a$, $102a$ of the flanges 101, 102 each have a number of concentric ridges formed thereon to provide labyrinth sealing. Further, the upper surface $104a$ and side surfaces $104b$ of the radially projected wall 104 also each have a number of ridges formed thereon to provide labyrinth sealing. Further, arcuate spacer projections 112 are formed integrally on an inner side edge of the end face $102a$ of the flange 102 on the other end side of each coil bobbin $11_1$, $11_2$ in circumferentially spaced relationship.

The base ends of first and second terminal members 113, 114 are respectively force-fitted into the terminal-fitting recesses $106_2$, $106_1$ of one coil bobbin $11_2$ positioned above as viewed in FIGS. 8 and 10. As seen in the figures, the first terminal member 113 comprises a main body portion $113a$ extending parallel with the axis of the one coil bobbin $11_2$, a fitting portion $113b$ bent at right angles from the bottom end of the main body portion $113a$ and extending toward the one coil bobbin $11_2$, a connecting portion $113c$ bent from the top end of the main body portion $113a$ and extending away from the coil bobbin $11_2$, and a terminal portion $113d$ bent at right angles from the connecting portion $113c$ and extending parallel with the main body portion $113a$ in spaced and opposed relation thereto. The terminal portion $113d$ is fitted into a terminal of a plug, not shown. As seen in the above-mentioned figures, the second terminal member 114 comprises a main body portion $114a$ extending parallel with the axis of the coil bobbin $11_2$, and a fitting portion $114b$ bent at right angles from the bottom end of the main body portion $114a$ and extending toward the one coil bobbin $11_2$. The fitting portion $113b$ of the first terminal member 113 is fitted into one terminal-fitting recess $106_2$ of the one coil bobbin $11_2$, and the main body portion $113a$ of same extends toward the flange 102 on the other side of the one coil bobbin $11_2$. The fitting portion $114b$ of the second terminal member 114 is fitted into the other terminal-fitting recess $106_1$ of the one coil bobbin $11_2$, and the main body portion $114a$ of same extends toward the flange 102. The main body portion $114a$ of the second terminal member 114 has a length approximately half the length of the main body portion $113a$ of the first terminal member 113.

The exciting coil $12_2$ is wound on the main body 100 of the coil bobbin $11_2$. As shown in FIGS. 8 and 10, the winding-starting end portion $122_a$ is hooked on the hooking projections 111 and 109 of the coil bobbin $11_2$, gripped by a gripping portion $114c$ of the second terminal member 113, and wound on the engaging projection $107_2$ of the one coil bobbin $11_2$ in engagement therewith. The winding-ending end portion of the coil $12_2$ in hooked on the engaging projection 110 of the coil bobbin $11_2$, gripped by gripping portion, not shown, of the first terminal member 113, and wound on the engaging projection $107_2$ in engagement therewith.

Third and fourth terminal members 115, 116 are force-fitted into the terminal-fitting recesses $106_1$, $106_2$ of the other coil bobbin $11_1$ which is positioned below as viewed in FIGS. 8 and 10. The third and fourth terminal members 115, 116 have the same construction, and, as shown in the figures, respectively comprise main body portions $115a$, $116a$ extending parallel with the axis of the other coil bobbin $11_1$, fitting portions $115b$, $116b$ bent at right angles from respective bottom ends of the main body portions 115a, 116a and extending toward the other coil bobbin 11₁, connecting portions 115c, 116c bent at right angles from top ends of the main body portions 115a, 116a and extending away from the other coil bobbin 11₁, and terminal portions 115d, 116d bent at right angles from the connecting portions 115c, 116c and extending parallel with the main body portions 115a, 116a in spaced and opposed relation thereto. The terminal portions 115d, 116d are fitted into terminals of plugs, not shown, respectively. The fitting portions 115b, 116b of the third and fourth terminal members 115, 116 are fitted into the respective terminal-fitting recesses 106₁, 106₂ of the other coil bobbin 11₁, and the main body portions 115a, 116a extend toward the flange 102 on the other side of the one coil bobbin 11₂. When the two coil bobbins are connected together, the connecting portions 115c, 116c of the third and fourth terminal members 115, 116 are on the same level with the connecting portion 113c of the first terminal member 113, while the front ends of the terminal portions 115d, 116d of the third and fourth terminal members 115, 116 are on the same level with the front end of the terminal portion 113d of the first terminal member 113 (see FIG. 11). On the other hand, the exciting coil 12₁ is wound on the main body 100 of the other coil bobbin 11₁ in a direction reverse to that of the exciting coil 12₂. A winding-starting end portion 12₁ₐ of the exciting coil 12₁ is hooked on the hooking projection 110 of the other coil bobbin 11₁, gripped by a gripping portion 116e of the fourth terminal member 116, and wound on the other engaging projection 107₂ of the other coil bobbin 11₁ in engagement therewith. A winding-ending end portion 12₁ᵦ of the exciting coil 12₁ is hooked on the hooking projections 111, 109 of the other coil bobbin 11₁, gripped by a gripping portion 115e of the third terminal member 115, and wound on the one engaging projection 107₁ of the other coil bobbin 11₁ in engagement therewith.

The yoke 17 which is formed of a magnetic material such as a ferrous metal is, as shown in FIG. 10, in the form of an arc obtained by cutting off part of a ring member. The yoke has engaging grooves 17₁, 17₂, 17₃ formed in the inner peripheral surface thereof, in which are force-fitted the corresponding axial projections 103₁ to 103₃ of the two coil bobbins 11₁, 11₂. Further, the yoke 17 has a plurality of (e.g. two) cutouts 17₄, 17₅ formed in the outer peripheral surface thereof at predetermined circumferential intervals.

Figure 11:
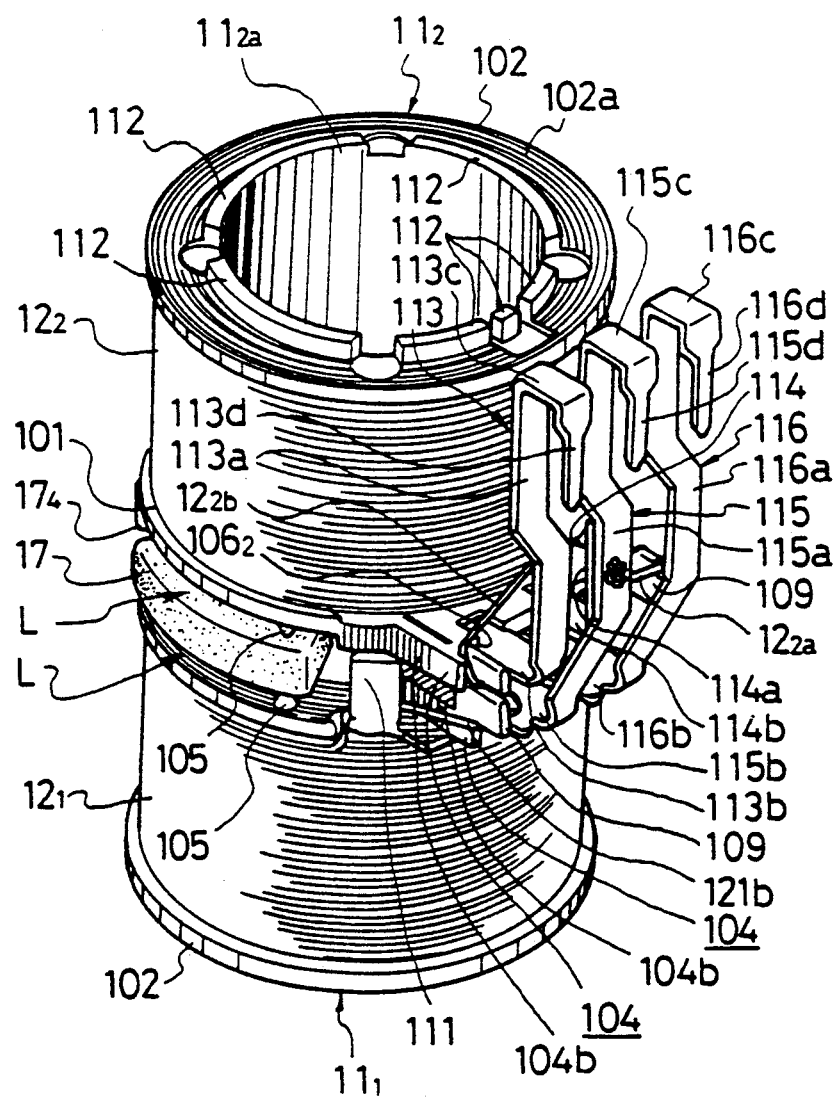
FIG. 11 is a perspective view of the coil bobbins and the yoke in their connected state.

In assembling the solenoid unit 10, first, as shown in FIG. 10, the flanges 101, 101 on each end side of the coil bobbins 11₁, 11₂ are brought into a position opposed to each other, with the yoke 17 placed therebetween. By force-fitting the axial projections 103₁ to 103₃ of the coil bobbins 11₁, 11₂ into the engaging grooves 17₁ to 17₃ of the yoke 17, the two coil bobbins 11₁, 11₂ are axially connected to each other via the yoke 17. In this connected state, the axial projections 103₁ to 103₃ of the two coil bobbins 11₁, 11₂ abut against their counterparts, and at the same time the spacer projections 105 of the flanges 101, 101 on each one side of the coil bobbins abut against the corresponding end faces of the yoke 17, whereby clearances L are formed between the yoke 7 and the flanges 101, 101 of the coil bobbins 11₁, 11₂ to be filled with resin during molding. In this connected state of the coil bobbins 11₁, 11₂, the main body portion 114a of the second terminal member 114 overlaps the main body portion 115a of the third terminal member 115, and the overlapped portions of the two terminal members 114 and 115 are subjected to projection welding. Thus the coil bobbins 11₁, 11₂ are axially connected to each other via the yoke 17 as shown in FIG. 11. Then, the resulting assembly is placed into a casing 120 molded from resin, with the outer peripheral surface of the yoke 17 exposed to the outside. Further, at the time of molding the casing 120, a socket 121 is formed integrally therewith (see FIGS. 3 and 8) to accommodate the terminal portions 113d, 115d, 116d of the terminal members 113, 115, 116. A plug on one end of an electric cord, not shown, is inserted into the socket 121 for electrical connection. The case 120 has an outer peripheral surface tapered such that its diameter increases toward the yoke 17 from both ends thereof. The caps 14₁, 14₂ are fitted onto the casing 120 from both ends thereof such that the inner peripheral surface of each one end of the caps are force-fitted on the outer peripheral surface of the yoke 17, whereby the frame for forming magnetic paths is formed (see FIGS. 2 and 3).

Next, the operation of the thus constructed electromagnetic valve device 1 the invention will be described.

When the exciting coils 12₁, 12₂ are not energized, the first armature 28 is biased downward by the urging force of the first return spring 31 such that the first spherical valve body 27 is in close contact with the valve seat surface 26b of the first valve seat member 26, whereby the valve mechanism 20₁ of the normally-closed electromagnetic valve 1₁ is closed. On the other hand, the second armature 48 is biased upward by the urging force of the second return spring 51 such that the second spherical valve body 47 is out of contact with the valve seat surface 46b of the second valve seat member 46, whereby the valve mechanism 20₂ of the normally-open electromagnetic valve 1₂ is open.

In this state, the passage 2d on the load side is disconnected from the passage 2c on the pressure source side by the valve mechanism 20₁, and at the same time connected to the fluid outlet port 20C via the valve mechanism 20₂.

More specifically, fluid from the antilock control chamber flows through the passage 2d on the load side, the filter F₁, and the passage 20B, and then part of the fluid flows through the passage 28d formed around the central holder portion 28a, the central hole 28c, and the spring-receiving recess 28b, of the first armature 28, while the remainder of the fluid flows through the passages 28e longitudinally formed in the outer peripheral surface of the first armature 28, and the space between the upper end of the first armature 28 and the lower end of the core 25, thus the whole flow of the fluid entering the first armature stopper 30. Then, the fluid flows from the axial through hole 46a of the second valve seat member 46, wherefrom part thereof flows through the passages 48d formed around the central holder portion 48a, the central role 48c, and the central recess 48b, of the second armature 48, and the remainder of the fluid flows through the passage 48e longitudinally formed in the outer peripheral surface of the second armature 48, and the cutouts 50a of the lower end of the second armature stopper 50, thus the whole flow of the fluid entering the second armature stopper 50. Then, the fluid flows into the reservoir tank 13 through the fluid outlet port 20C and the filter F₂.

When the two exciting coils 12₁, 12₂ are energized, the first armature 28 is attracted upward against the urging force of the first return spring 31 so that the first spherical valve boby 27 moves away from the valve seat surface 26b of the first valve seat member 26, whereby the valve mechanism $20_1$ is opened. On the other hand, the second armature 48 is attracted downward against the urging force of the second return spring 51 so that the second spherical valve body 47 is brought into contact with the valve seat surface 46b of the second valve seat member 46, whereby the valve mechanism $20_2$ is closed.

In this state, the passage 2d on the load side is disconnected from the fluid outlet port 20C by the valve mechanism $20_2$, and at the same time connected to the passage 2c on the pressure source side by the valve mechanism $20_1$.

More specifically, fluid from the passage 2c on the pressure source side flows through the fluid inlet port 20A, the filter $F_3$, the central through hole 23c' of the reduced-diameter portion 23c, and the axial through hole 26a formed through the first valve seat member 26, and then part of the fluid flows directly into the passage 20B axially formed through the boundary shoulder portion between the reduced diameter portion 23c and the increased diameter portion 23d of the first hollow cylinder 23, while the remainder of the fluid flows into the passage 20B through the passages 28d formed around the central holder portion 28a, the central hole 28c, and the spring-receiving recess 28b, of the first armature 28, the cutouts 30a of the lower end of the first armature stopper 30, and the passages 28e longitudinally formed in the outer peripheral surface of the first armature 28. And then the fluid flows through the filter $F_1$ and the passage 2d on the load side into the antilock control chamber.

According to the present embodiment, the solenoid unit 10 and the valve unit 20 are respectively assembled in advance as shown in FIG. 2. Then the cylindrical body 20a is inserted into the through hole 10a until the annular engaging projection 20b abuts against the end face 14$_{1b}$ of the cap 14$_1$. Then, the other end 20c of the cylindrical body 20a is caulked, e.g. at three points to thereby fix the valve unit 20 to the solenoid unit 10 as shown in FIG. 1 to form the electromagnetic valve device 1 having the two electromagnetic valves $1_1$, $1_2$. In this way, the electromagnetic valve device 1 can be easily assembled, which makes the device 1 suitable for mass production.

Further, according to the present embodiment, the manner of assembling the valve unit 20 is as follows (see FIGS. 1 and 4):

First, the hollow cylindrical portion 23b of the first hollow cylinder 23 with the filter $F_3$, the first valve seat member 26 and the armature pipe 29 mounted therein is force-fitted into one end of the first pipe 21, while the hollow cylindrical portion 24b of the second hollow cylinder 24 with the filter $F_2$, the second armature stopper 50 and the armature pipe 46 mounted therein is force-fitted into one end of the second pipe 22.

Then, the first armature 28 is inserted into the armature pipe 29 and at the same time the return spring 31 is interposed between the first armature 28 and the second valve seat member 46. In this state, the other end of the first pipe 21 is force-fitted onto the first hollow axial portion 25a of the core 25 with the first armature stopper 30 and the second valve seat member 46 mounted therein.

Then, the second armature 48 inserted into the armature pipe 49 and at the same time the return spring 51 is interposed between the second armature 48 and the core 25. In this state, the other end of the second pipe 22 is force-fitted onto the second hollow axial portion 25b of the core 25. Thus, assemblage of the valve unit 20 is completed. In this way, the valve unit 20 can be easily assembled.

Figure 5:
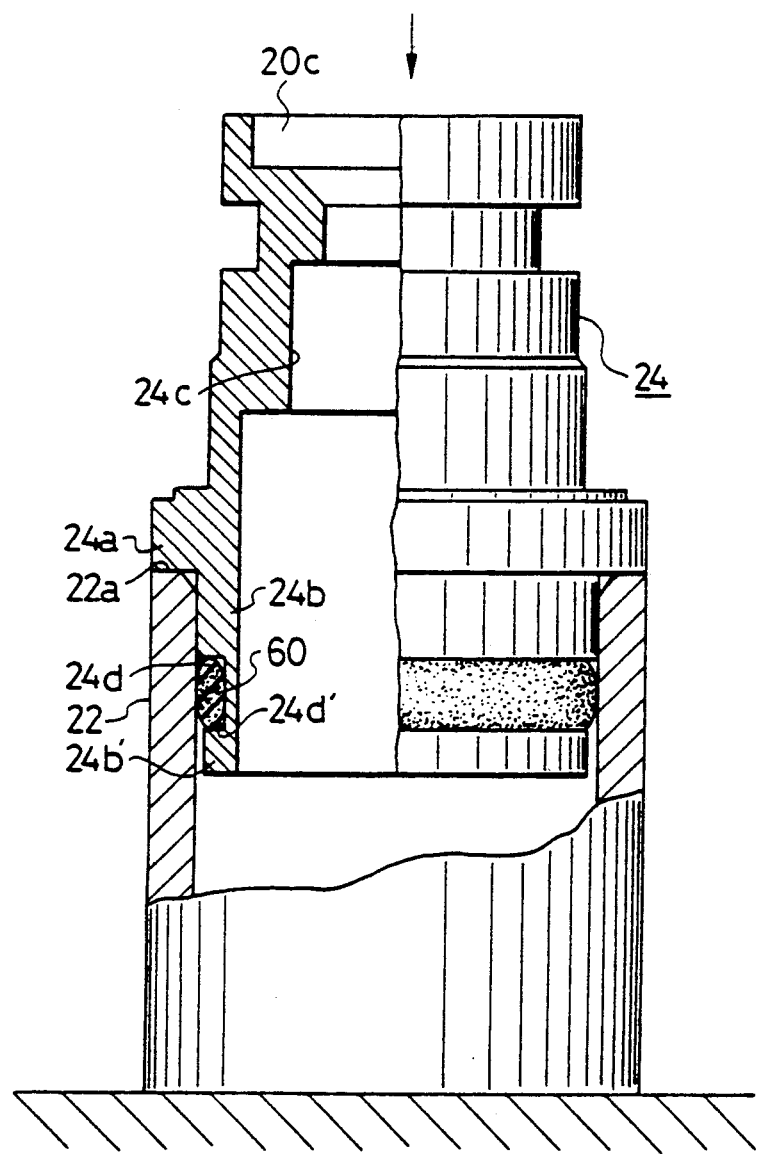
FIG. 5 is a fragmentary cross-sectional view of a force-fitting section of the valve unit appearing in FIG. 2.
Figure 6:
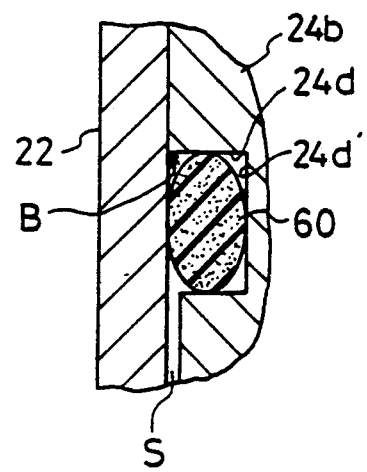
FIG. 6 is a fragmentary enlarged cross-sectional view of part of the force-fitting section of FIG. 5.

Further, acording to the present embodiment, the portions, 23b', 24b' of the hollow cylindrical portions 23b, 24b have slightly reduced diameters such that clearances S are formed between the portions 23b' 24b' and the corresponding inner peripheral surfaces of the pipes 21, 22 (see FIGS. 5 and 6). Therefore, in assembling the valve unit 20, as the hollow cylindrical portions 23b, 24b are force-fitted into the respective pipes 21, 22, the outer peripheral surfaces of the hollow cylindrical portions 23b, 24b are force-fitted into the respective inner peripheral surfaces of the pipes 21, 22 only after the O-rings 61, 60 are brought into contact with the inner peripheral surfaces of the pipes 21, 22. Therefore, as shown in FIG. 5, burrs B produced upon force-fitting are prevented by the O-rings 61, 60 from entering the pipes 21, 22. Similarly, the portions 25a', 25b' of the first and second hollow shaft portions 25a, 25b have slightly reduced diameters such that clearances are formed between the portions 25a' 25b' and the corresponding inner peripheral surfaces of the pipes 21, 22 (see FIGS. 1 and 4). Therefore, as the hollow shaft portions 25a, 25b are force-fitted into the respective pipes 21, 22, the outer peripheral surfaces of the hollow shaft portions 25a, 25b are force-fitted into the respective inner peripheral surfaces of the pipes 21, 22 only after the O-rings 62, 63 are brought into contact with the inner peripheral surfaces of the pipes 21, 22. Therefore, similarly to the hollow cylindrical portions 23b, 24b, burrs B produced upon force-fitted are prevented by the O-rings 62, 63 from entering the pipes 21, 22.

Further, according to the present embodiment, after the armature pipe 49 is fitted into the hollow cylindrical portion 24b, the armature pipe 49 is fixed to the second hollow cylinder 24 by caulking the end face 24e of the hollow cylindrical portion 24b, e.g. at three points 24e' which are located radially inward of the bottom face 24d' of the annular groove 24d. Thus, deformation of the O-ring 60 is prevented. Similarly, after the armature pipe 29 is fitted into the hollow cylindrical portion 23b, similar caulking is effected to prevent deformation of the O-ring 61.

Further, according to the present embodiment, the coil bobbins 11$_1$, 11$_2$ are fixed to the yoke 17 and connected to each other by fitting the axial projections 103$_1$ to 103$_3$ of each coil bobbin 11$_1$, 11$_2$ into the engaging grooves 17$_1$ to 17$_3$ (see FIGS. 1 and 10). Therefore, the solenoid unit 10 can be easily assembled by a simple means, which makes the electromagnetic valve device more suitable for mass production.

Further, according to the present embodiment, the solenoid unit 10 includes the casing 120 formed of resin which is molded into a hollow cylinder such that it covers the coil bobbins fixed to the yoke 17 and connected to each other. Part of the outer peripheral surface of the yoke 17 is exposed to the outside. The caps 14$_1$, 14$_2$ are fitted onto the casing 120 from both ends thereof, and the open ends of the caps 14$_1$, 14$_2$ are force-fitted onto and fixed to the outer peripheral surface of the yoke 17 (see FIGS. 1 and 3). Thus, the solenoid unit 10 can be assembled easily by a simple means.

Further, according to the present embodiment, spacer projections 105 are formed on the end faces of the coil bobbins 11$_1$, 11$_2$ respectively opposed to both end faces of the yoke 17, which projections 105 abut against the end facesd of the yoke 17 and form clearances L to be filled with resin during molding. At the same time, the end faces of the coil bobbins $11_1$, $11_2$ opposed to the yoke 17 have rough surfaces formed with ridges for labyrinth sealing (see FIGS. 8, 10, and 11). This assures that during molding of the casing 120, resin positively fills the clearances between the coil bobbins $11_1$, $11_2$ and the yoke 17 and resin asheres reliably to the opposed end faces of the coil bobbins $11_1$, $11_2$ and the yoke 17. Thus, excellent resin moldability can be obtained.

Further, according to the present embodiment, the engaging projections $107_1$, $107_2$ are formed on end faces of the coil bobbins facing towards the yoke 7, on which projections $107_1$, $107_2$ are engagingly wound the winding-starting end portions $12_{1a}$, $12_{2a}$ and winding-ending end portions $12_{1b}$, $12_{2b}$ of the exciting coils $12_1$, $12_2$ which are wound on the coil bobbins. Further, these engaging projections $107_1$, $107_2$ are formed with acute cutting edges $108_1$, $108_2$ for cutting off the coils (see FIG. 10). This makes the coil bobbins more suitable for automatical winding machine which automatically winds the exciting coils on the coil bobbins.

Further, a socket to which is connected the plug of the electric cord is formed integrally with the casing 120. This further improves the mass-productivity.

Figure 12:
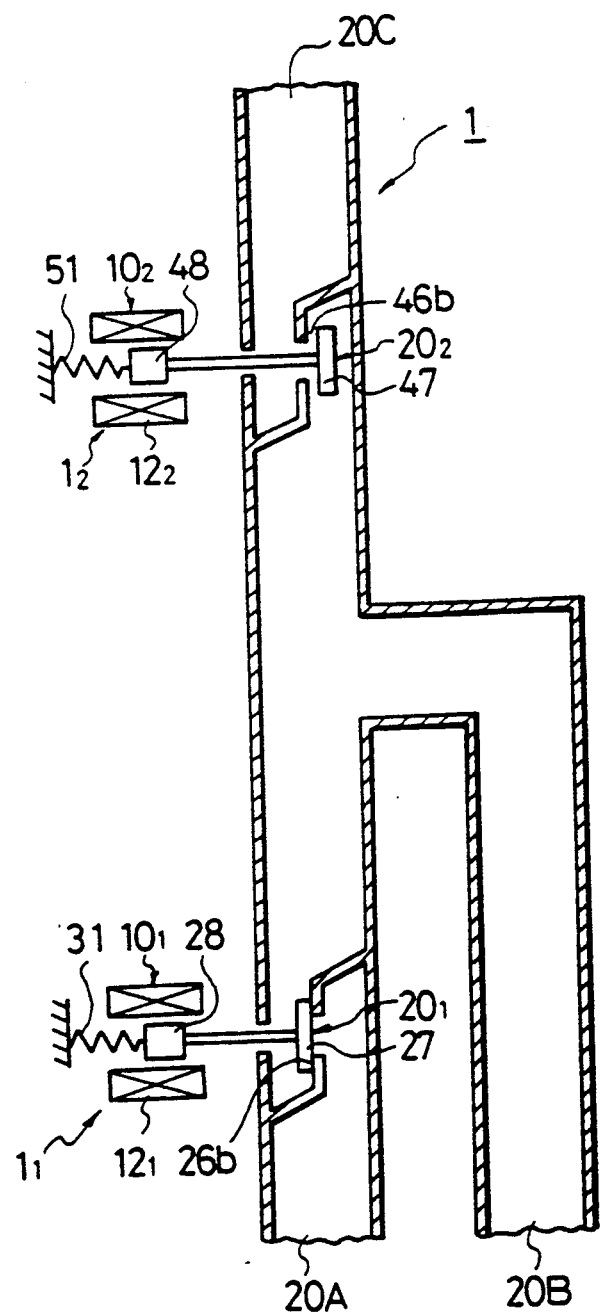
FIG. 12 is a schematic diagram useful in explaining the opening/closing timing of two electromagnetic valves of the electromagnetic valve device shown in FIG. 1.

Next, the opening/closing timing of the two electromagnetic values $1_1$, $1_2$ of the electromagnetic valve device 1 according to the present embodiment will be described with reference to FIG. 12 which is a simplified view of FIG. 1.

As described in detail above, the electromagnetic valve device 1 is a three-way valve in which the state of communication between the three passages for fluid, i.e. the passage 2c on the pressure source side, the passage 2d on the load side, and a fluid inlet port 13a of the reservoir tank 13, respectively connected to the fluid inlet port 20A, the passage 20B, and the fluid outlet port 20C (see FIG 1) is changed over by opening/closing the valve mechanisms $20_1$, $20_2$.

When the passage 2d on the load side is to be communicated with the passage 2c on the pressure source side, it is required to cut off the communication between the passage 2d on the load side and the fluid inlet port 13a Therefore, in this electromagnetic valve device 1, when the exciting coils $12_1$, $12_2$ are energized, the valve mechanism $20_2$ of the normally-open electromagnetic valve $1_2$ has to be closed before the valve mechanism $20_1$ of the normally-closed electromagnetic valve $1_1$ is opened.

To this end, according to in the present embodiment, (1) the magentically attracting forces F1, F2 of the respective solenoids $10_1$, $10_2$ are set almost equal to each other, i.e. F1 $\approx$ F2, while the urging forces K1, K2 of the respective return springs 31, 51 are set such that K1 is larger than K2, i.e. K1 >K2.

Alternatively, (2) the urging forces K1, K2 are set almost equal to each other, i.e. K1 $\approx$ K2, while the magnetically attracting force F1, are set smaller than the magnetically attracting force F2, i.e. F1 <F2.

Thus, according to the above described electromagnetic valve device 1, in both the above settings (1) and (2), before one valve mechanism $20_1$ is opened, the other valve mechanism $20_2$ is positively closed, whereby it is possible to prevent an undesired state of communication between the three passages 2c, 2d, 13a for fluid e.g. the phenomenon that all the passages 2c, 2d, 13a are communicated together at the same time.

Further, as a variation of the above embodiment, the electromagnetic valve device 1 may use a normally-open type as the electromagnetic valve $1_1$, and a normally-closed type as the electromagnetic valve $1_2$.

In this variations, when the exciting coils $12_1$, $12_2$ are deenergized, the valve mechanism $20_2$ of the normally-closed electromagnetic valve $1_2$ has to be closed before the vlave mechanism $20_1$ of the normally-open electromagnetic valve is opened.

Figure 13:
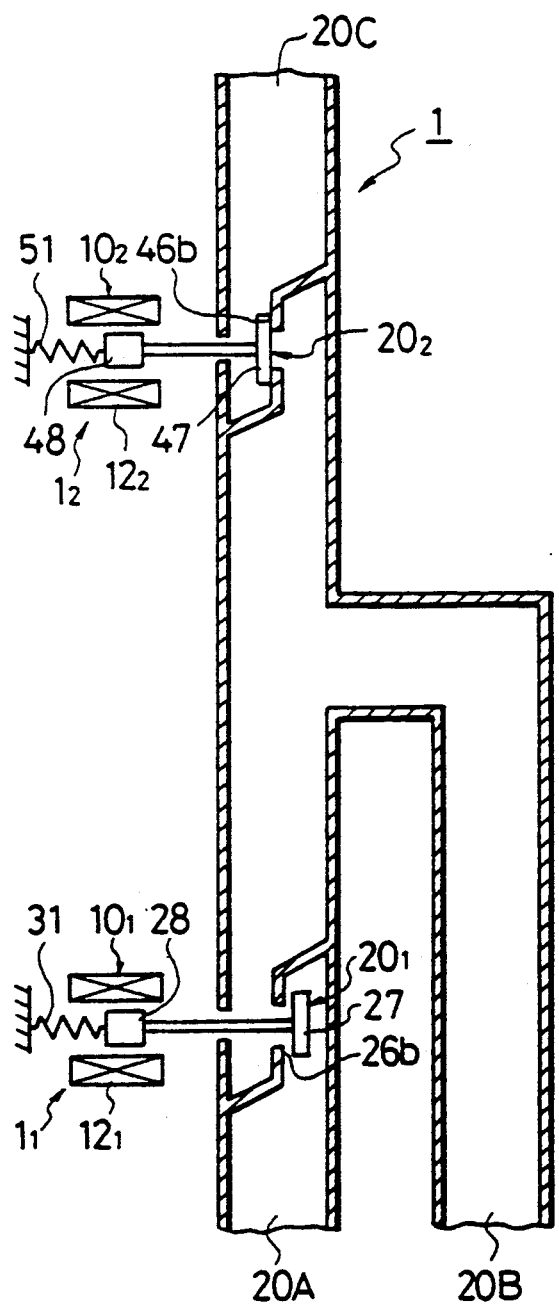
FIG. 13 is a schematic diagram useful in explaining the opening/closing timing of two electromagnetic valves of the electromagnetic valve device having an arrangement inverse to that of the electromagnetic valve device of FIG. 12, such that a normally-closed type of the valves is positioned above a normally-open type of same.

Therefore, according to the variation shown in FIG. 13, the magnetically attracting forces F1, F2 are set almost equal to each other, i.e. F1 $\approx$ F2, while the urging forces K1, K2 of the respective return springs 31, 51 are set such that K1<K2.

Thus, in this electromagnetic valve device, when the exciting coils $12_1$, $12_2$ are deenergized at the same time, before the one valve mechanism $20_1$ is opened, the other valve mechanism $20_2$ is positively closed.

The above description with reference to FIGS. 12 and 13 can be summarized as follows:

In an electromagnetic valve device having two electromagnetic valves, which comprises a pair of solenoids, a pair of valve mechanisms (valve means) including a pair of valve bodies which are opened and closed by the respective solenoids, and a pair of return springs urging the respective valve bodies, the valve device functioning as a three-way valve for selectively establishing communication between three passages for fluid by opening or closing of the valve mechanisms, either the magnetically attracting forces of the solenoids or the urging forces of the return springs are set different from each other, whereby it is possible to make the timing of opening/closing of one valve mechanism different from that of opening/closing of the other valve mechanism. Thus, the timing of opening/closing of the valve mechanisms of the two electromagnetic valves can be reliably set as desired, which in turn enables to prevent occurrence of an undesired state of communication between the three passages for fluid.

Next, an assembly unit having a plurality of electromagnetic valve devices, according to another embodiment of the invention, will be described with reference to FIGS. 14 to 20.

In FIGS. 14 to 20, elements and parts corresponding to those in FIGS. 1 to 19 are indicated by identical reference numerals, and detailed description thereof is omitted.

Figure 14:
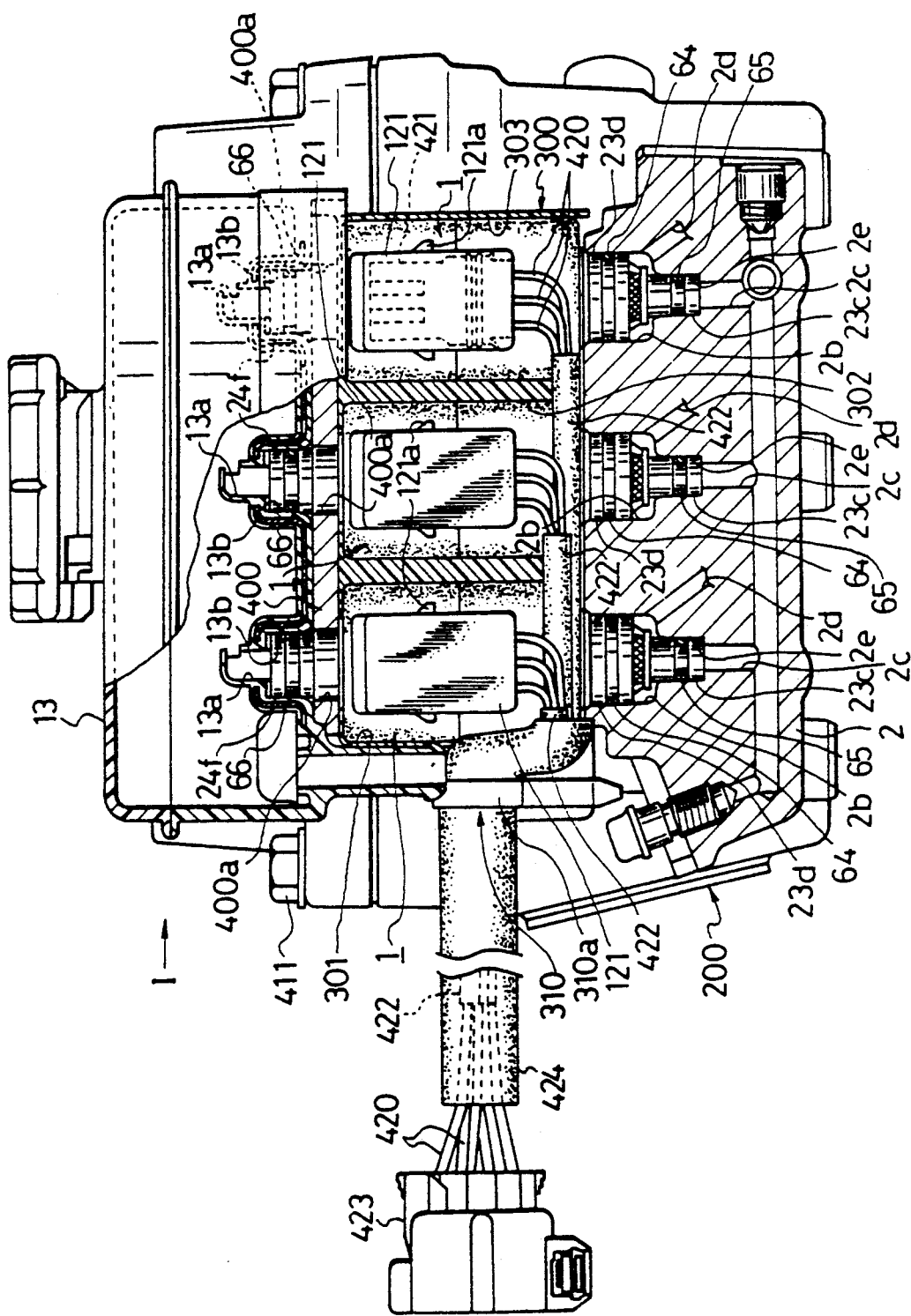
FIG. 14 is an elevational view, partly in cross-section, of an assembly having a plurality of electromagnetic valve devices according to another embodiment of the invention.

FIG. 14 shows in elevation an assembly unit having a plurality of electromagnetic valve devices, according to the present embodiment, part of which is shown in cross-section. This assembly unit is incorporated into an antiskid control brake system.

Figure 15:
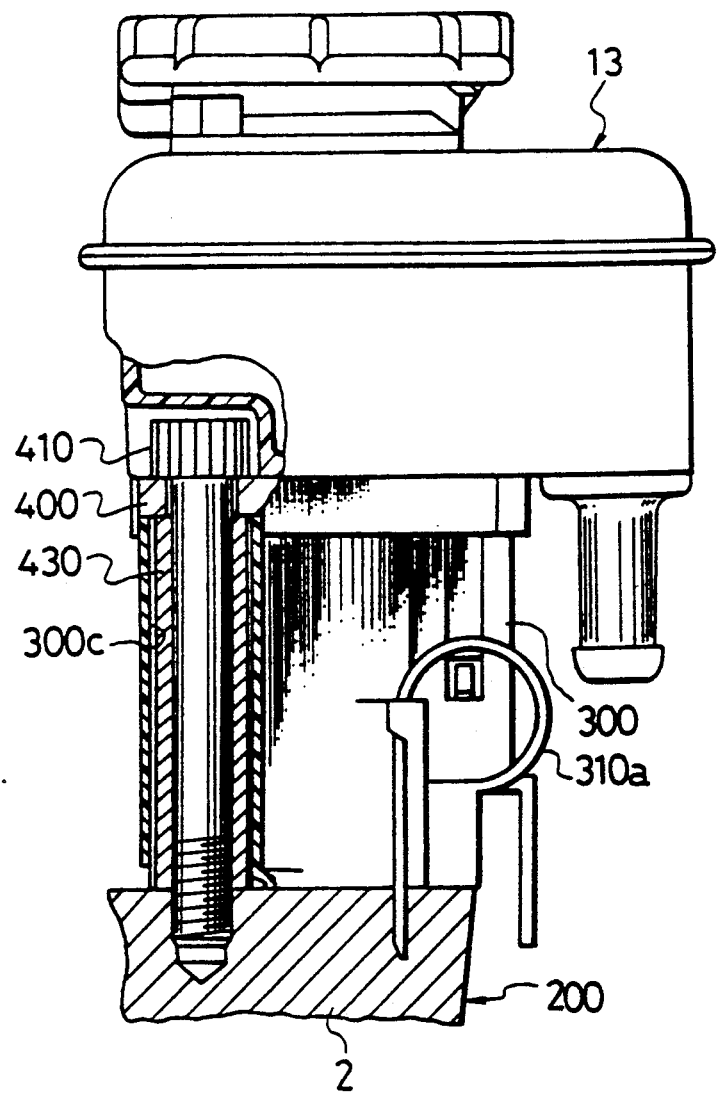
FIG. 15 is a view as viewed in the direction of the arrow I in FIG. 14.

The assembly unit comprises, as shown in FIGS. 14 and 15, three electromagnetic valve devices 1, a body 2 (base member) of a modulator 200, on which the three electromagnetic valve devices are placed and in which are formed three pairs of passages 2c for fluid on pressure source side and passages 2d for fluid on load side, communication between each pair of passages 2c and 2d being controlled by an associated one of the three electromagnetic valve devices independently of the other pairs, a casing 300 formed of resin and having formed therein three separate chambers 301 to 303 respectively accommodating the three electromagnetic valve devices 1. The casing 300 is sandwiched between the modulator body 2 and a clamping plate 400 and fixed to the modulator body 2 by bolts 410. Placed on the clamping plate 400 is a reservoir tank 13 which is fixed to the modulator body 2 by bolts 411.

As shown in FIGS. 1 and 14, the increased-diameter portion 23d of the first hollow cylinder 23 of the valve device 1 is fitted in the mounting hole 2b of the modulator body 2 via an O-ring 64, and the reduced-diameter portion 23c of same is fitted in a mounting hole 2e of the modulator body via an O-ring 65. Further, as shown in FIGS. 1, 4, and 14, a hollow cylindrical portion 24f on the outlet side of the second hollow cylinder 24 of each valve device 1 is fitted in a corresponding mounting recess 13b of the reservoir tank 13 via an O-ring 66.

Figure 16:
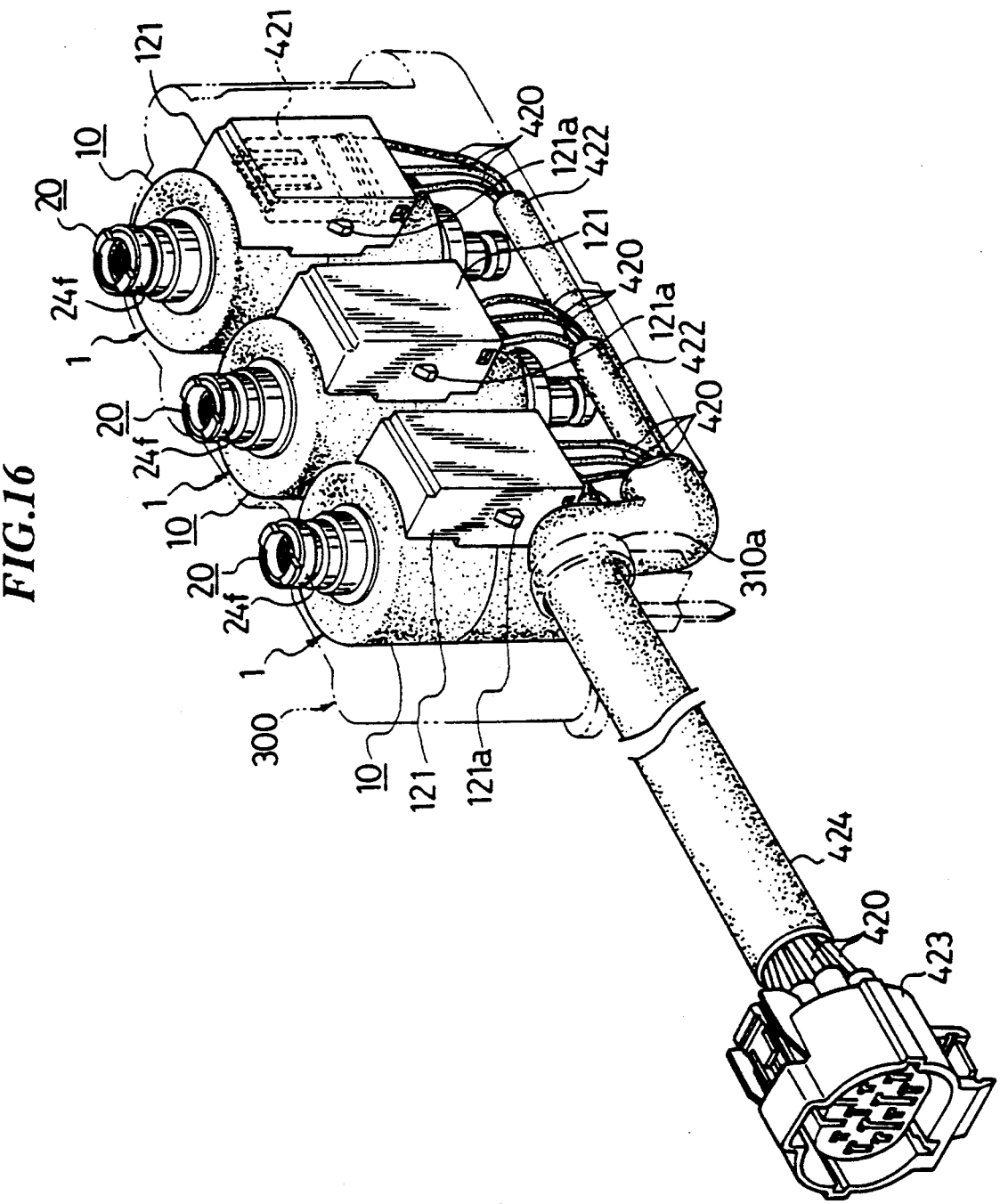
FIG. 16 is a perspective view showing a plurality of electromagnetic valve devices accommodated in a casing formed of resin.

As shown in FIGS. 2, 14, and 16, each of the sockets 121 has engaging pawls 121a formed on both sides thereof. A plug 421 connected to ends of three connecting cords 420 is inserted into each socket 121 (see FIGS. 14 and 16). The three connecting cords 420 extend through a collecting tube 422 formed of resin and are connected to a collecting coupler 423. Three collecting tubes 422 extend through a thick collecting tube 424 formed of resin. The collecting coupler 424 is connected to a control system, not shown, installed on an automotive vehicle.

Figure 17:
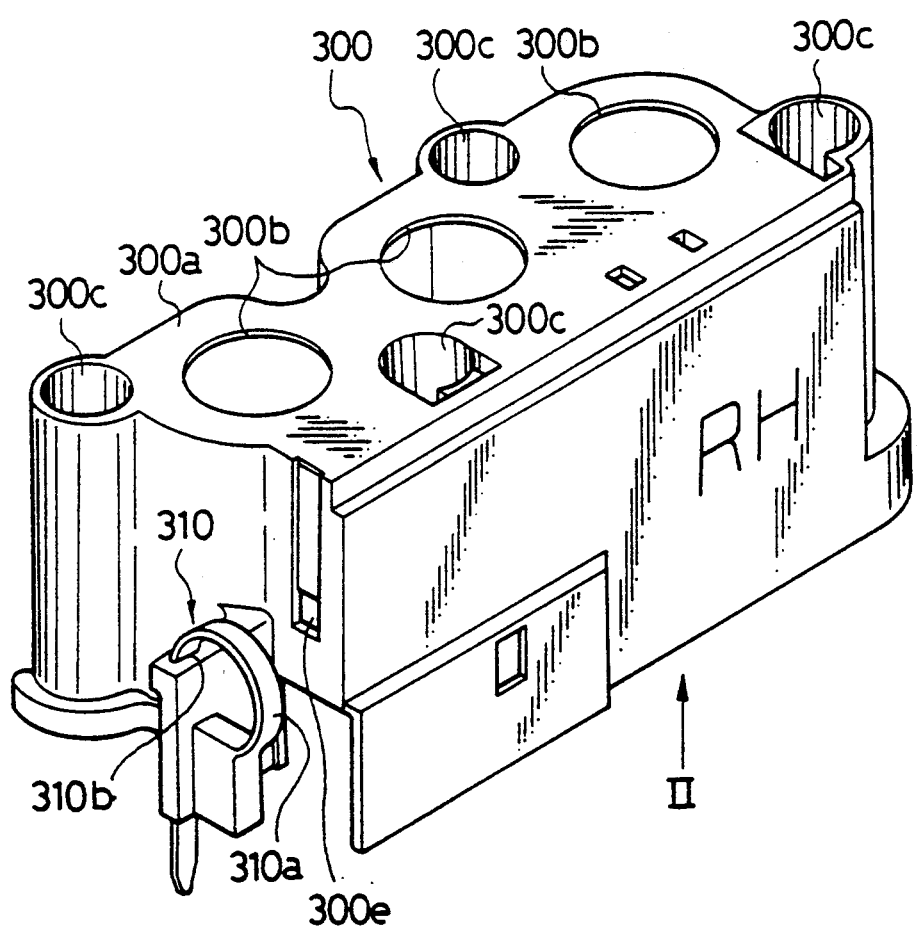
FIG. 17 is a perspective view showing the casing of FIG. 16.
Figure 18:
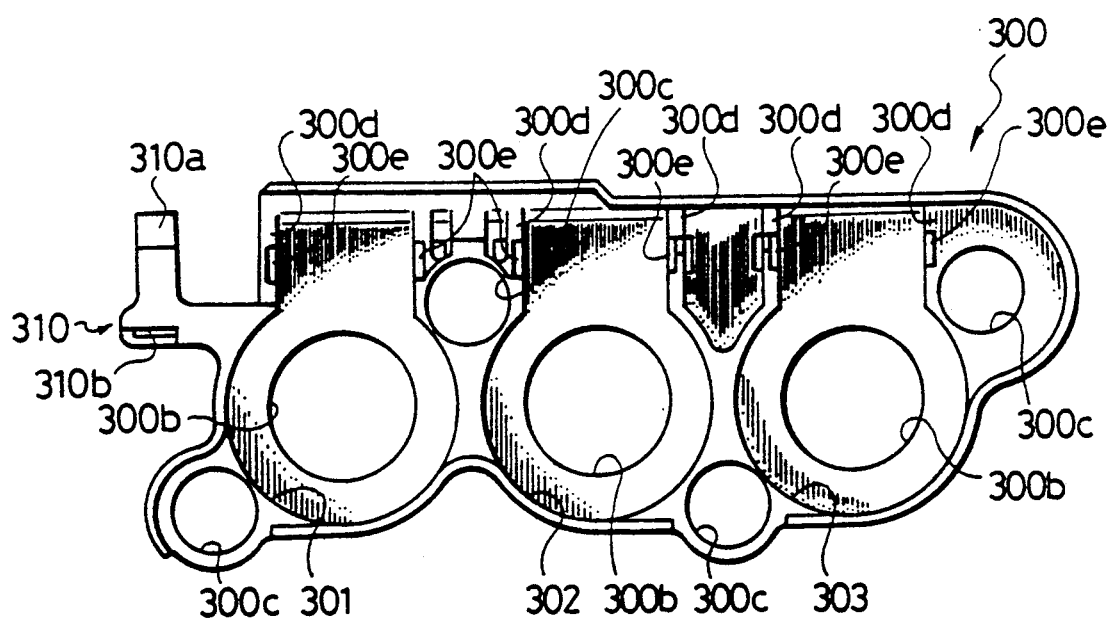
FIG. 18 is a view as viewed in the direction of the arrow II in FIG. 17.

As shown in FIGS. 17 and 18, the casing 300 has the separate chambers 301 to 303 formed therein. A top wall 300a of the casing 300 has three inserting holes 300b formed therethrough and communicating with the respective chambers, through which are fitted the respective hollow cylindrical portions 24f of the valve devices 1. Further, four through holes 300c are formed through the casing 300, through which are fitted tubes 430 formed of a metal (see FIG. 15). A front wall of the casing 300 bears a mark indicating whether the casing 300 is to be used for a right-steering-handled vehicle or a left-steering-handled vehicle. In this embodiment, the casing bears the mark RH indicating the right-steering-handled vehicle (see FIG. 19). Formed integrally on one side of the casing 300 is a clamping member 310 clamping the thick collecting tube 424 extending from the interior of the casing 300 as shown in FIGS. 14 and 16. The clamping member 310 comprises a belt 310a wound on the thick collecting tube 424, and a clamping hole 310b through which the belt 310a is inserted for clamping (see FIGS. 14, 17, and 18). Further, as shown in FIGS. 18 to 20, a cylindrical wall 300d defining each chamber 301 to 303 of the casing 300 has engaging holes 300e in which are engaged the engaging pawls 121a formed on each socket 121.

Figure 19:
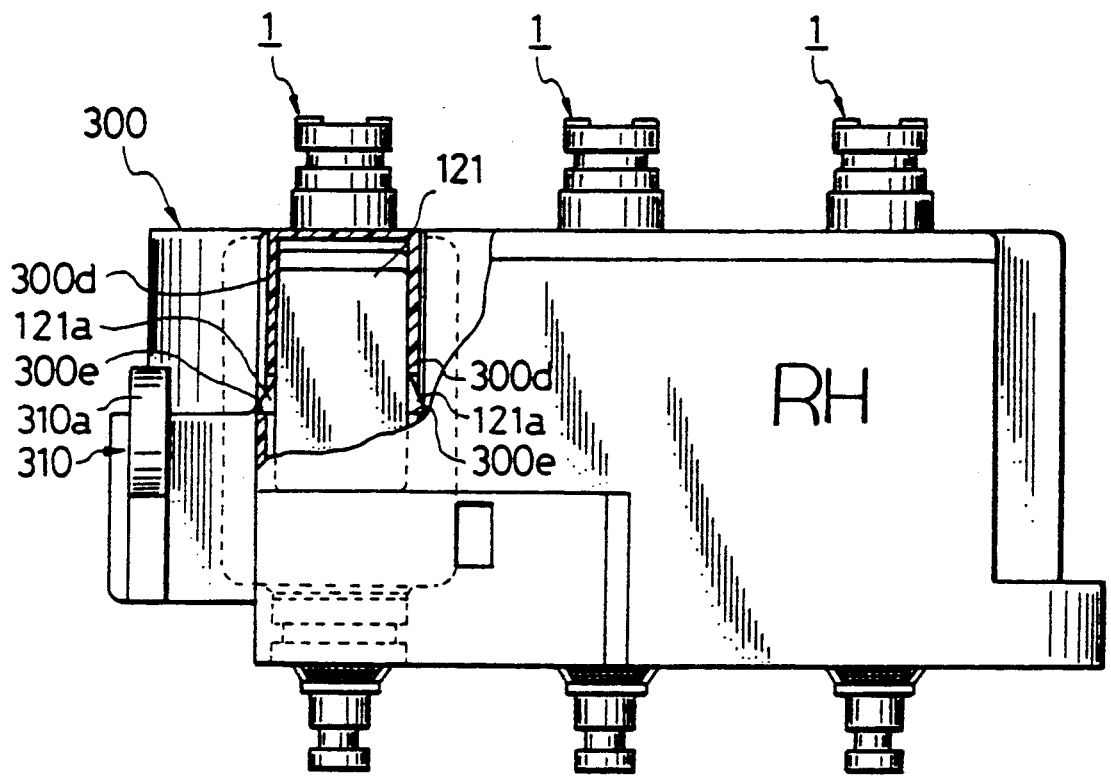
FIG. 19 is an elevational view, partly in cross-section, showing a plurality of electromagnetic valve devices accommodated in a casing formed of resin.
Figure 20:
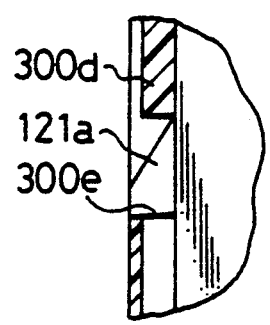
FIG. 20 is a cross-sectional view showing part of FIG. 19 on an enlarged scale.

In assembling the assembly unit constructed as above, the electromagnetic valve devices 1 are inserted into the respective chambers 301 to 303 of the casing 300 until the engaging pawls 121a of each socket 121 are engaged into the corresponding engaging holes 300e (see FIGS. 14 and 19). Thus, the electromagnetic valve devices 1 are held in the respective chambers 301 to 303.

Then, the plugs 421 are inserted into the respective sockets 121 of the valve devices 1, and the thick collecting tube 424 is fixed to the casing by the belt 310a of the clamping member 310 (see FIGS. 14 and 16).

Then, the electromagnetic valve devices 1 held in the casing 300 are placed onto the modulator body 2 such that the increased-diameter portions 23d and the reduced-diameter portions 23c are fitted in the mounting holes 2b and 2e, respectively.

Then, the clamping plate 400 are placed onto the valve devices 1 such that inserting holes 400a formed through the clamping plate 400 are fitted on portions of the second hollow cylinders 24 of the valve devices 1, which are projected out of the inserting holes 300b of the casing 300. The bolts 410 are inserted through the tubes 430 which have previously been inserted into the inserting through holes 300c of the casing, followed by fastening the bolts 410. In this manner, the casing 300 is clamped between the modulator body 2 and the clamping plate 400 to be fixed to the modulator body 2.

Then, the reservoir tank 13 is placed onto the clamping plate 400 such that mounting recesses 13b of the former are fitted on the hollow cylindrical portions 24f of the valve devices 1, and then the reservoir tank 23 is fixed to the modulator body 2 by bolts 411. Thus, the assembling work of the assembly unit is completed.

According to the present embodiment, when assembling the assembly unit, it is only required that the casing 300 with the electromagnetic valve devices 1 previously mounted therein is placed onto the modulator body, without necessitating a complicated work of placing a plurality of valve devices on the modulator body at predetermined separate locations and then placing the casing onto the modulator body for receiving the valve devices. Further, since the electromagnetic valve devices are accommodated in the respective chambers separately formed in the casing formed of resin, they do not have adverse affects on magnetically attracting forces produced by adjacent valve devices.

According to the present embodiment, the casing bears on an outer surface thereof a mark RH indicating that the assembly unit is to be used for a right-steering-handled vehicle or a mark LH indicating that it is to be used for a left-steering-handled vehicle. Therefore, assembly workers can easily discriminate by the eye as to whether a casing 300 is for a left-steering-handled vehicle or for a right-steering-handled vehicle. This is practically very convenient.

Further, according to the present embodiment, the assembly unit has the tube 424 covering a plurality of connecting cords connected to the valve devices 1 and extending therefrom, and the clamping member 310 formed on one side of the casing 300 for holding and clamping the tube 424. Therefore, no special clamping member is needed, which is separate from the casing 300, thus contributing to reduction of the number of component parts, and also to reduction of the manufacturing cost.

Further, according to the present embodiment, the socket 121 of each electromagnetic valve device 1 has the engaging pawls 121a formed on both sides thereof, and at the same time the cylindrical wall 300d defining each chamber 301 to 303 of the casing 300 has the engaging holes 300e formed therein and engaged with the engaging pawls 121a to thereby hold each valve device 1 in the corresponding chamber. Therefore, to hold the electromagnetic valve devices 1 in the casing 300, each valve device 1 has only to be inserted into the corresponding chamber 301 to 303 until the engaging pawls 121a of the each valve device 1 are engaged in the engaging holes, respectively. Thus, the electromagnetic valve devices 1 can be easily held in the casing 300.

What is claimed is:

1. An electromagnetic valve device having two electromagnetic valves, comprising:
a solenoid unit having a unit construction in the form of a hollow cylinder having a through hole axially extending therethrough, said solenoid unit including a pair of solenoids having a pair of coil bobbins arranged in superposed coaxial relationship and each having a central through hole formed therein and an exciting coil wound thereon, and a pair of caps for forming magnetic paths, each of said caps having an end wall having formed therein an opening concentric with said central through hole of each of said coil bobbins, said opening forming said through hole together with said central through hole of each of said coil bobbins, said caps accommodating respective associated ones of said coil bobbins, said caps being joined together in a manner such that said caps have open ends thereof opposed to each other; and a valve unit having a pair of valve means having a pair of valve bodies which are opened and closed by respective ones of said solenoids, said valve unit having a unit construction in the form of a substantially solid cylinder, said valve unit being mounted in said solenoid unit in a manner such that said valve unit has a cylindrical body thereof fitted through said through hole of said solenoid unit;

said valve unit comprising a core having a first hollow shaft portion and a second hollow shaft portion on opposite sides thereof, a first pipe and a second pipe having one ends thereof force-fitted, respectively, on said first and second hollow shaft portions, a first hollow cylinder and a second hollow cylinder each having a hollow cylindrical portion force-fitted into another end of an associated one of said first and second pipes, and a flange abutting against an end face of said another end of said associated one of said first and second pipes, and a first armature and a second armature each holding an associated one of said valve bodies and slidably arranged within an associated one of said first and second hollow cylinders, wherein said cylindrical body of said valve unit has an outer peripheral surface thereof formed by outer peripheral surfaces of said flanges of said first and second hollow cylinders and outer peripheral surfaces of said first and second pipes.

2. An electromagnetic valve device according to claim 1, including annular grooves formed respectively in said hollow cylindrical portions of said first and second hollow cylinders and said first and second hollow shaft portions, and O-rings mounted respectively in said annular grooves, and wherein said hollow cylindrical portions of said first and second hollow cylinders and said first and second hollow shaft portions have portions closer to respective ends thereof than respective ones of said annular grooves, which are reduced in diameter such that clearances are formed between respective ones of said portions and associated respective inner peripheral surfaces of said first and second pipes.

3. An electromagnetic valve device according to claim 2, including a first armature pipe and a second armature pipe in which said first and second armatures are slidably fitted, said first and second armature pipes being fitted in respective ones of said first and second hollow cylinders, and wherein said first and second armature pipes are fixed to said respective ones of said first and second hollow cylinders by caulking respective end faces of said hollow cylindrical portions at points which are located radially inward of respective bottom faces of said annular grooves.

4. An electromagnetic valve device having two electromagnetic valves, comprising:

a solenoid unit having a unit construction in the form of a hollow cylinder having a through hole axially extending therethrough, said solenoid unit including a pair of solenoids having a pair of coil bobbins arranged in superposed coaxial relationship and each having a central through hole formed therein and an exciting coil wound thereon, and a pair of caps for forming magnetic paths, each of said caps having an end wall having formed therein an opening concentric with said central through hole of each of said coil bobbins, said opening forming said through hole together with said central through hole of each of said coil bobbins, said caps accommodating respective associated ones of said coil bobbins, said caps being joined together in a manner such that said caps have open ends thereof opposed to each other; and a valve unit having a pair of valve means having a pair of valve bodies which are opened and closed by respective ones of said solenoids, said valve unit having a unit construction in the form of a substantially solid cylinder, said valve unit being mounted in said solenoid unit in a manner such that said valve unit has a cylindrical body thereof fitted through said through hole of said solenoid unit;

said solenoid unit including a yoke interposed between said coil bobbins, said coil bobbins being joined together in a manner such that said coil bobbins have ends thereof opposed to each other and fixedly fitted in said yoke.

5. An electromagnetic valve device according to claim 4, wherein said solenoid unit further includes a casing formed of resin which is molded into a hollow cylinder such that it covers said coil bobbins fixed to said yoke, said yoke having an outer peripheral surface thereof exposed in part to the outside, said caps being fitted onto said casing from both ends thereof, said caps having said open ends thereof and force-fitted onto and fixed to said outer peripheral surface of said yoke.

6. An electromagnetic valve device according to claim 5, wherein said yoke has at least one engaging groove formed in an inner peripheral surface thereof, said coil bobbins having end faces opposed respectively to both end faces of said yoke, said end faces of said coil bobbins each having at least one axial projection formed thereon and force-fitted in said at least one engaging groove, at least one spacer projection formed thereon, said at least one spacer projection abutting against an associated one of said both end face faces of said yoke and forming clearances to be filled with resin during molding, and a rough surface formed with ridges for labyrinth sealing.

7. In an electromagnetic valve device having two electromagnetic valves, including a pair of solenoids, a pair of valve means including a pair of valve bodies which are opened and closed by respective ones of said solenoids, and a pair of return springs urging respective ones of said valve bodies, said electromagnetic valve device functioning as a three-way valve for selectively establishing communication between three fluid passages by opening and closing of said valve means, the improvement wherein:

a first one of said valve means is arranged to carry out a changeover of communication and cutoff between (i) a first passage of said three fluid passages which is common to both of said pair of valve means, and (ii) a second passage of said three fluid passages, for fluid communicating with a reservoir;

a second one of said valve means is arranged to carry out a changeover of communication and cutoff between said first passage and a third passage of said three fluid passages, for fluid communicating with a fluid supply source;

one of said pair of valve means being of a normally-open type, and the other of said pair of valve means being of a normally-closed type; and said solenoids having magnetically attracting forces thereof which are set different from each other to make a timing of opening and closing of one of said valve means different from a timing of opening and closing of the other of said valve means.

8. In an electromagnetic valve device having two electromagnetic valves, including a pair of solenoids, a pair of valve means including a pair of valve bodies which are opened and closed by respective ones of said solenoids, and a pair of return springs urging respective ones of said valve bodies, said electromagnetic valve device functioning as a three-way valve for selectively establishing communication between three fluid passages by opening and closing of said valve means, the improvement wherein:

a first one of said valve means is arranged to carry out a changeover of communication and cutoff between (i) a first passage of said three fluid passages for fluid communicating with a fluidic device, which is common to both of said valve means, and (ii) a second passage of said three fluid passages, for fluid communicating with a reservoir;

a second one of said valve means is arranged to carry out a changeover of communication and cutoff between said first passage and a third passage of said three fluid passages, for fluid communicating with a fluid supply source;

one of said pair of valve means being of a normally-open type, and the other of said pair of valve means being of a normally-closed type; and said return springs having respective urging forces thereof which are set different from each other to make a timing of opening and closing of one of said valve means different from the timing of opening and closing of the other of said valve means.

* * * * *